(12) United States Patent
Abe

(10) Patent No.: US 9,250,426 B2
(45) Date of Patent: Feb. 2, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/487,597

(22) Filed: Sep. 16, 2014

(65) Prior Publication Data

US 2015/0092279 A1    Apr. 2, 2015

(30) Foreign Application Priority Data

Oct. 2, 2013    (JP) .................. 2013-207104

(51) Int. Cl.
G02B 15/14    (2006.01)
G02B 15/173   (2006.01)
G02B 15/20    (2006.01)
G02B 15/16    (2006.01)

(52) U.S. Cl.
CPC .............. *G02B 15/173* (2013.01); *G02B 15/14* (2013.01); *G02B 15/16* (2013.01); *G02B 15/20* (2013.01)

(58) Field of Classification Search
CPC ......... G02B 15/14; G02B 15/16; G02B 15/20
USPC ..................................... 359/676, 683
See application file for complete search history.

(56) References Cited

FOREIGN PATENT DOCUMENTS

JP    2007-178598 A    7/2007
JP    2007-178769 A    7/2007

*Primary Examiner* — William Choi
(74) *Attorney, Agent, or Firm* — Carter, DeLuca, Farrell & Schmidt, LLP

(57) ABSTRACT

Provided is a zoom lens, comprising, in order from an object side to an image side: first to fifth lens units having positive, negative, positive, positive, and negative refractive powers, respectively. During zooming, the first, third, and fifth lens units are immovable, and the second and fourth lens units are moved. The fifth lens unit includes a partial unit (L5n) having a negative refractive power, and a partial unit (L5p) having a positive refractive power. An entire lens length (TL), a focal length (ft) of an entire system at a telephoto end, a focal length (f2) of the second lens unit, a focal length (f4) of the fourth lens unit, and a focal length (f5n) of the partial unit (L5n) are set appropriately.

7 Claims, 13 Drawing Sheets

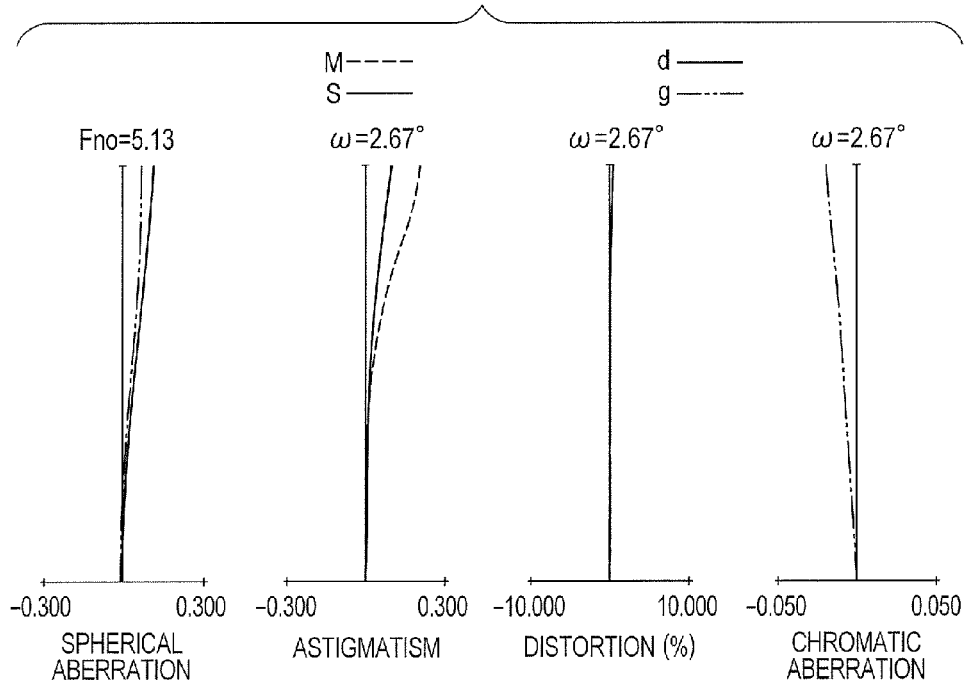
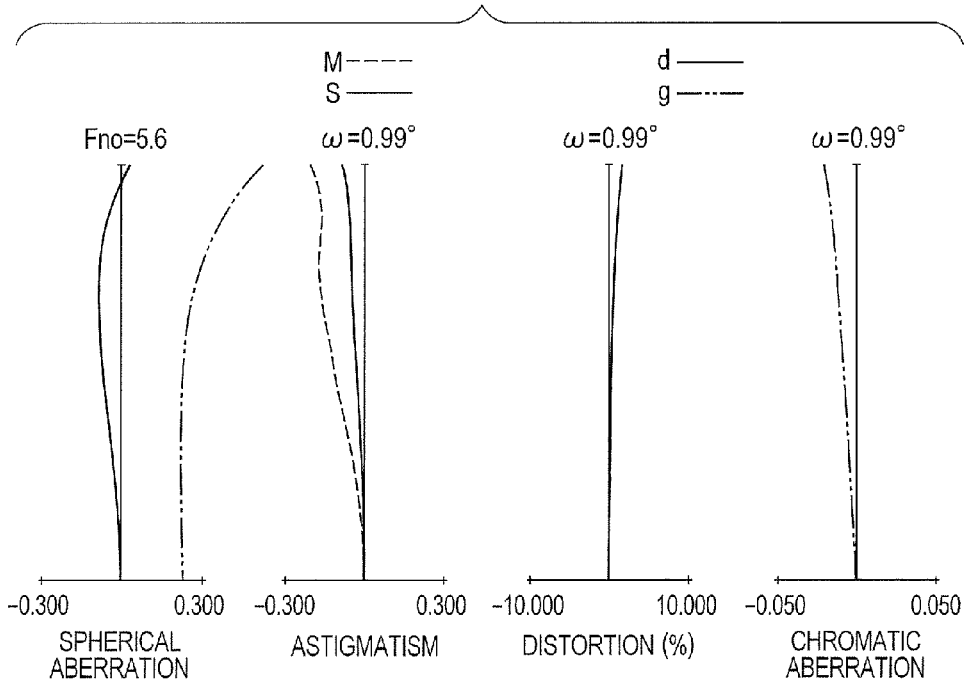

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for an image pickup apparatus using a solid-state image pickup element, such as a video camera, an electronic still camera, a broadcasting camera, and a monitor camera, or an image pickup apparatus such as a silver-halide film camera.

2. Description of the Related Art

In recent years, a zoom lens which has a short total lens length, a compact size, a high zoom ratio, and a high resolving power has been requested for an imaging optical system used in an image pickup apparatus. A positive lead type zoom lens in which a lens unit having a positive refractive power is arranged closest to an object is known as a zoom lens which responds to those requests. As the positive lead type zoom lens, there is known a zoom lens which is constructed of five lens units as a whole.

In Japanese Patent Application Laid-Open No. 2007-178598 and Japanese Patent Application Laid-Open No. 2007-178769, there is disclosed a zoom lens which includes first to fifth lens units having positive, negative, positive, positive, and negative refractive powers and being arranged in order from an object side to an image side, and which carries out zooming by moving the second lens unit and the fourth lens unit, and carries out focusing by moving the fourth lens unit.

In a zoom lens in general, in order to realize the downsizing of the entire system while the high zoom ratio is ensured, it is only necessary to reduce the number of lenses while increasing the refractive powers of the lens units constructing the zoom lens.

However, in the zoom lens structured in such a manner, a lens thickness increases with an increase in the refractive power of each of the lens surfaces, and an effect of shortening the lens system becomes insufficient. Further, at the same time, various aberrations are frequently generated, and hence the satisfactory correction for the various aberrations becomes difficult to carry out. Thus, the high optical characteristic becomes difficult to obtain.

SUMMARY OF THE INVENTION

According to one embodiment of the present invention, there is provided a zoom lens, comprising, in order from an object side to an image side: a first lens unit having a positive refractive power; a second lens unit having a negative refractive power; a third lens unit having a positive refractive power; a fourth lens unit having a positive refractive power; and a fifth lens unit having a negative refractive power, during zooming, the first lens unit, the third lens unit, and the fifth lens unit being immovable, and the second lens unit and the fourth lens unit being moved, in which the fifth lens unit includes a partial unit having a negative refractive power and a partial unit having a positive refractive power in order from the object side to the image side with a widest air gap in the fifth lens unit as a boundary, and the following conditional expressions are satisfied:

$1.70 < ft/TL < 2.50;$ $23 < ft/|f2| < 100;$ and $1.0 < f4/|f5n| < 5.0,$ where TL represents an entire lens length, ft represents a focal length of an entire system at a telephoto end, f2 represents a focal length of the second lens unit, f4 represents a focal length of the fourth lens unit, and f5n represents a focal length of the partial unit having the negative refractive power.

Further features of the present invention will become apparent from the following description of exemplary embodiments with reference to the attached drawings.

BRIEF DESCRIPTION OF THE DRAWINGS

FIG. 6B is an aberration diagram at an intermediate zoom position of the lens of Example 3.

FIG. 6C is an aberration diagram at a telephoto end of the lens of Example 3.

DESCRIPTION OF THE EMBODIMENTS

Preferred Embodiments of the Present Invention will now be described in detail in accordance with the accompanying drawings.

Now, exemplary embodiments of the present invention are described in detail with reference to the attached drawings. A zoom lens according to one embodiment of the present invention comprises, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. In addition, during zooming, the first lens unit, the third lens unit, and the fifth lens unit are immovable, while the second lens unit and the fourth lens unit are moved.

The fifth lens unit includes a partial unit L5n having a negative refractive power and a partial unit L5p having a positive refractive power in order from the object side to the image side with a widest air gap in the fifth lens unit as a boundary. Herein, the partial unit means a single lens or a cemented lens which is obtained by cementing two or more lenses.

Figure 1:
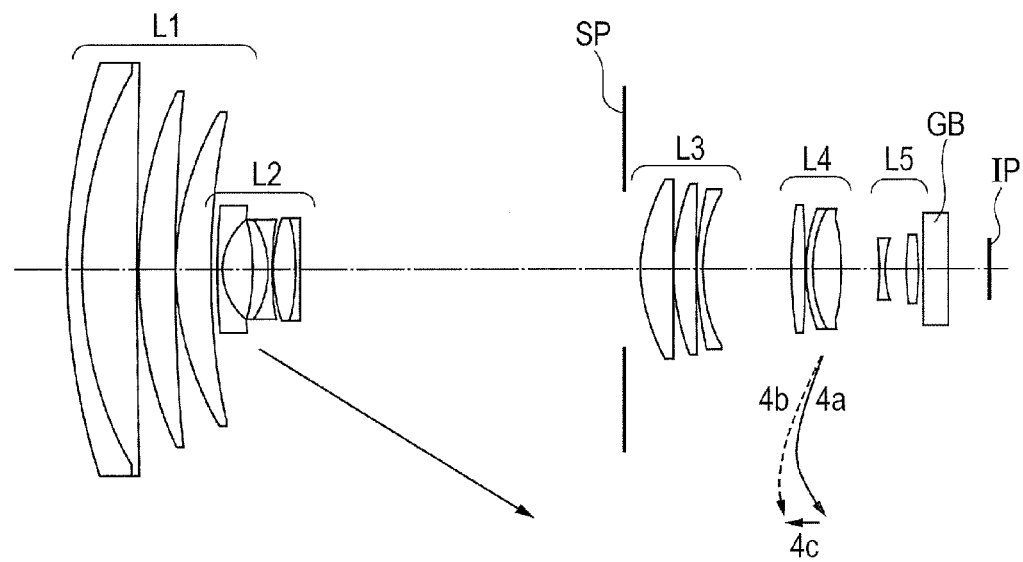
FIG. 1 is a cross-sectional view of a lens according to Example 1 of the present invention.
Figure 2A:
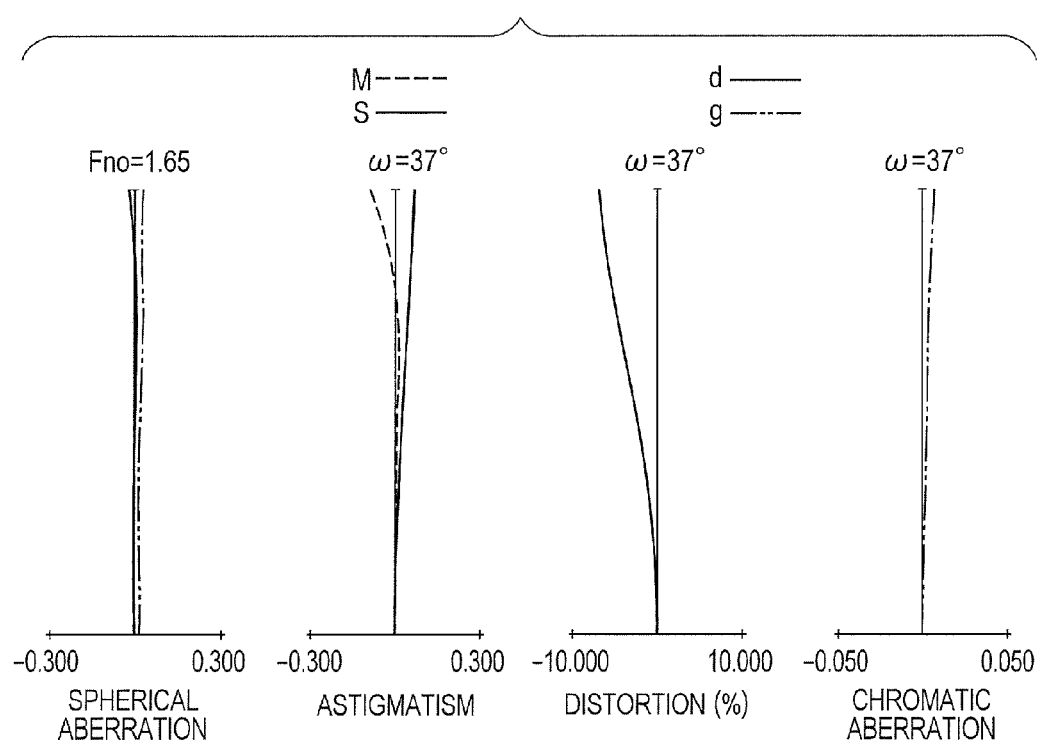
FIG. 2A is an aberration diagram at a wide angle end of the lens of Example 1.
Figure 2B:
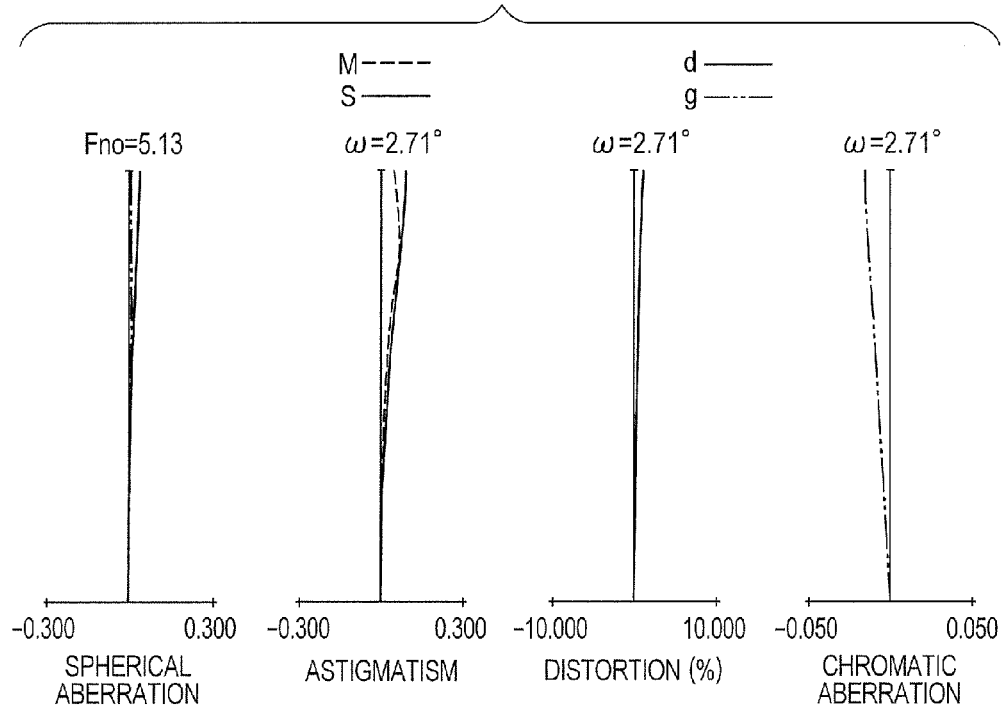
FIG. 2B is an aberration diagram at an intermediate zoom position of the lens of Example 1.
Figure 2C:
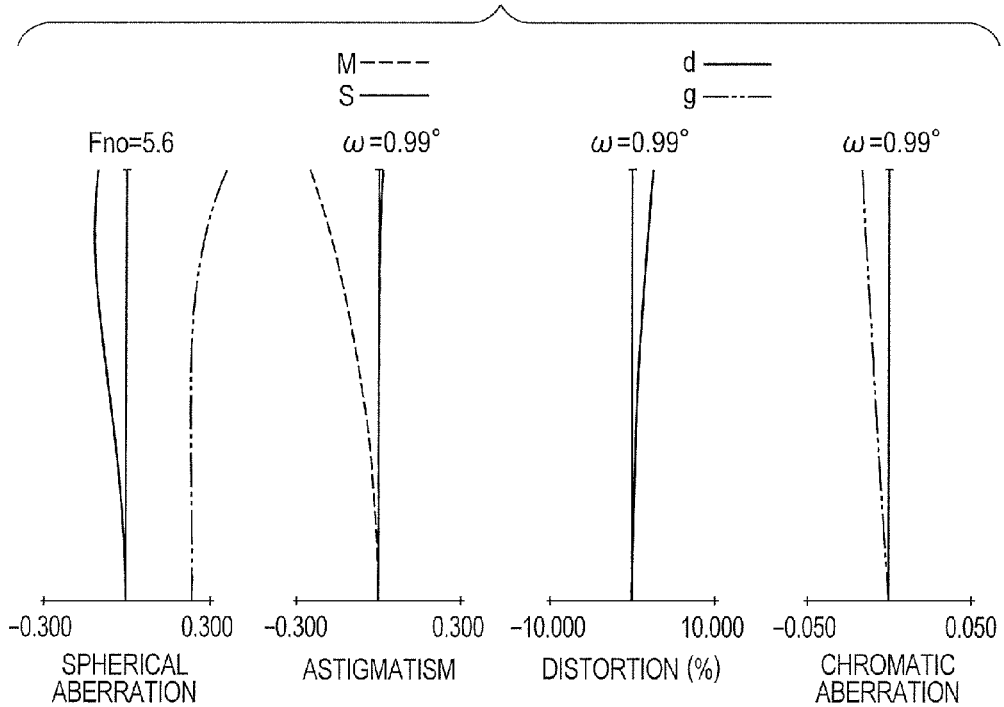
FIG. 2C is an aberration diagram at a telephoto end of the lens of Example 1.

FIG. 1 illustrates a lens cross section at a wide angle end (short focal length end) of a zoom lens according to Example 1 of the present invention. FIGS. 2A, 2B, and 2C are aberration diagrams at a wide angle end, an intermediate zoom position, and a telephoto end (long focal length end), respectively, of the zoom lens of Example 1. The zoom lens of Example 1 has a zoom ratio of 39.50 and an aperture ratio (F number) of 1.65 to 5.60.

Figure 3:
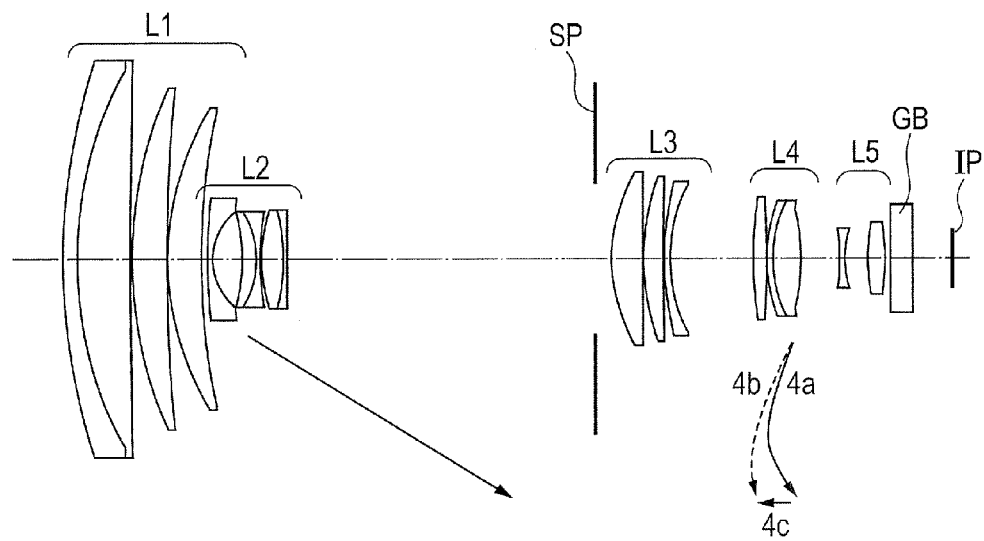
FIG. 3 is a cross-sectional view of a lens according to Example 2 of the present invention.
Figure 4A:
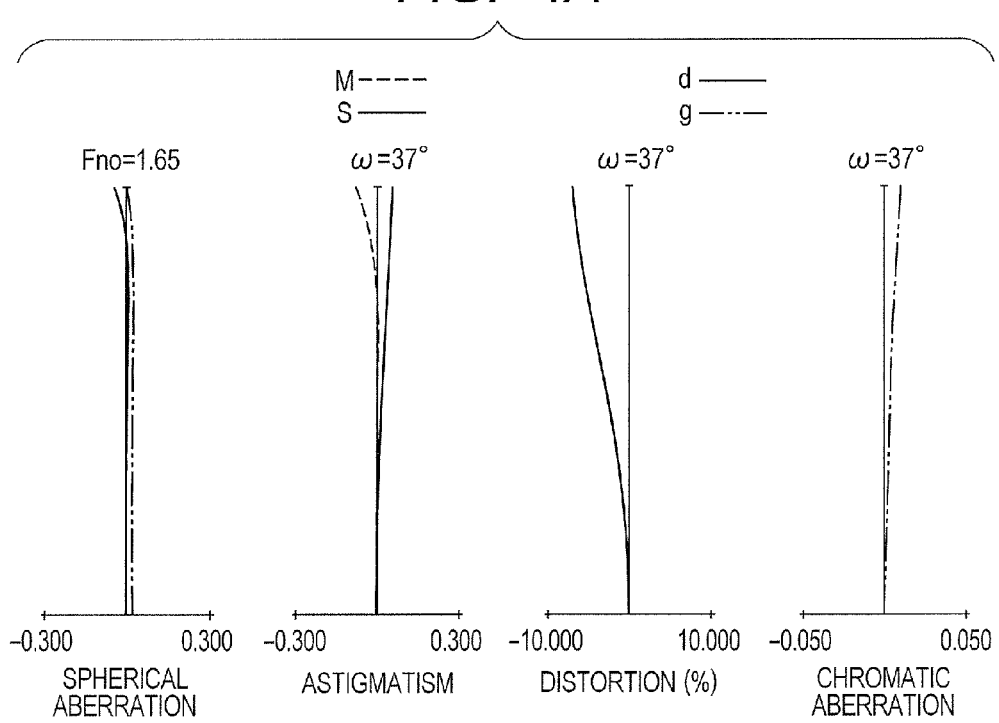
FIG. 4A is an aberration diagram at a wide angle end of the lens of Example 2.
Figure 4B:
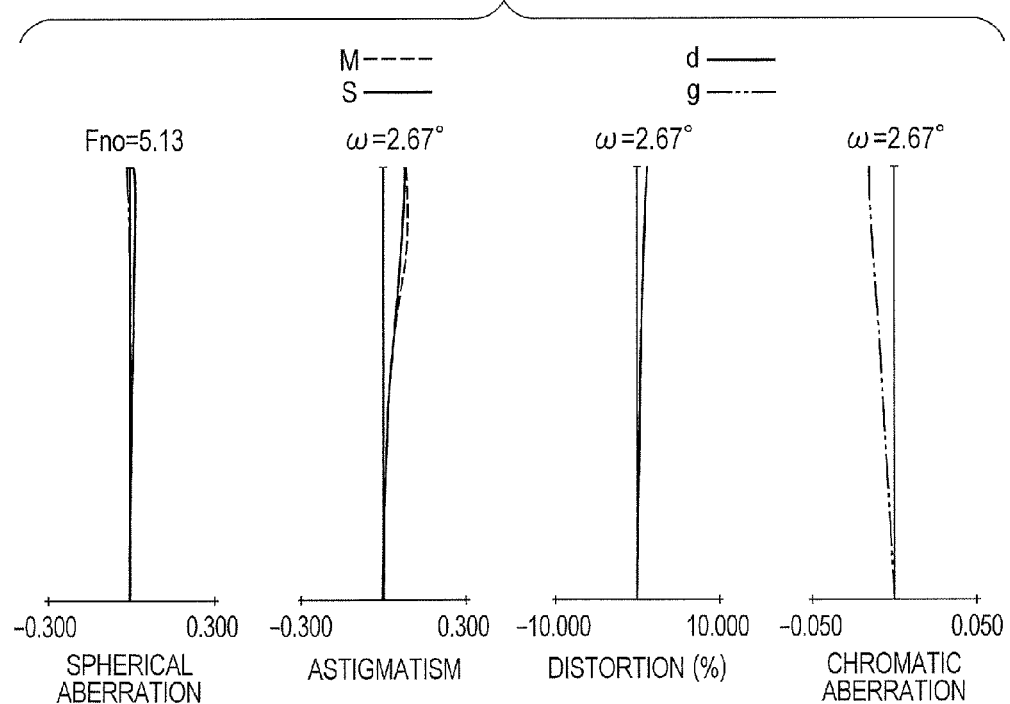
FIG. 4B is an aberration diagram at an intermediate zoom position of the lens of Example 2.
Figure 4C:
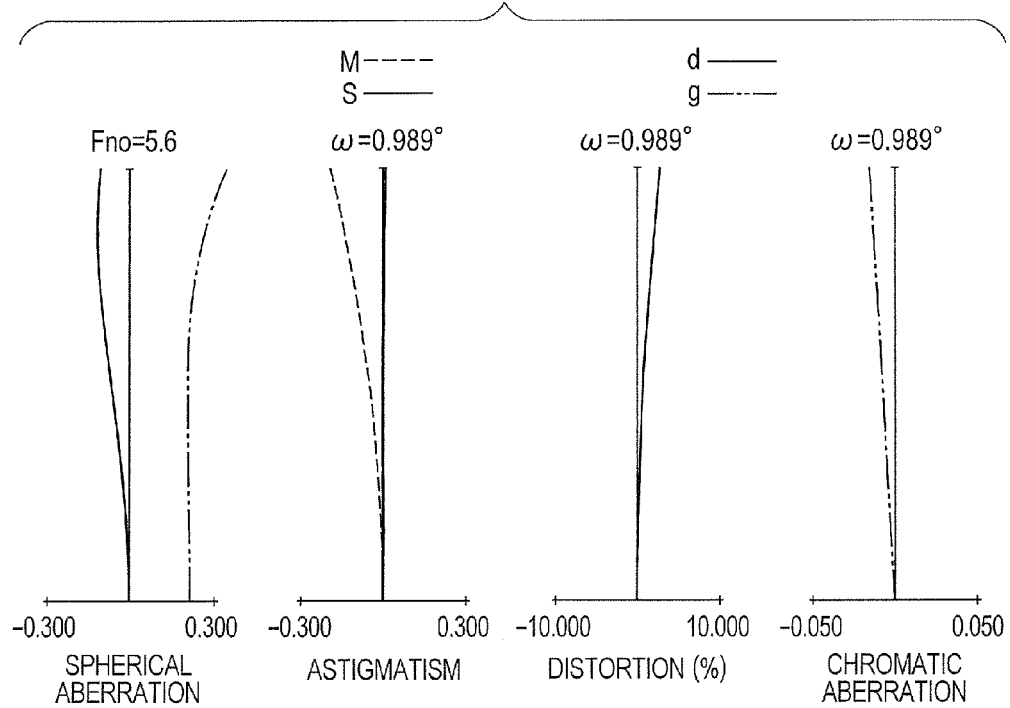
FIG. 4C is an aberration diagram at a telephoto end of the lens of Example 2.

FIG. 3 illustrates a lens cross section at a wide angle end of a zoom lens according to Example 2 of the present invention. FIGS. 4A, 4B, and 4C are aberration diagrams at a wide angle end, an intermediate zoom position, and a telephoto end, respectively, of the zoom lens of Example 2. The zoom lens of Example 2 has a zoom ratio of 39.49 and an aperture ratio (F number) of 1.65 to 5.60.

Figure 5:
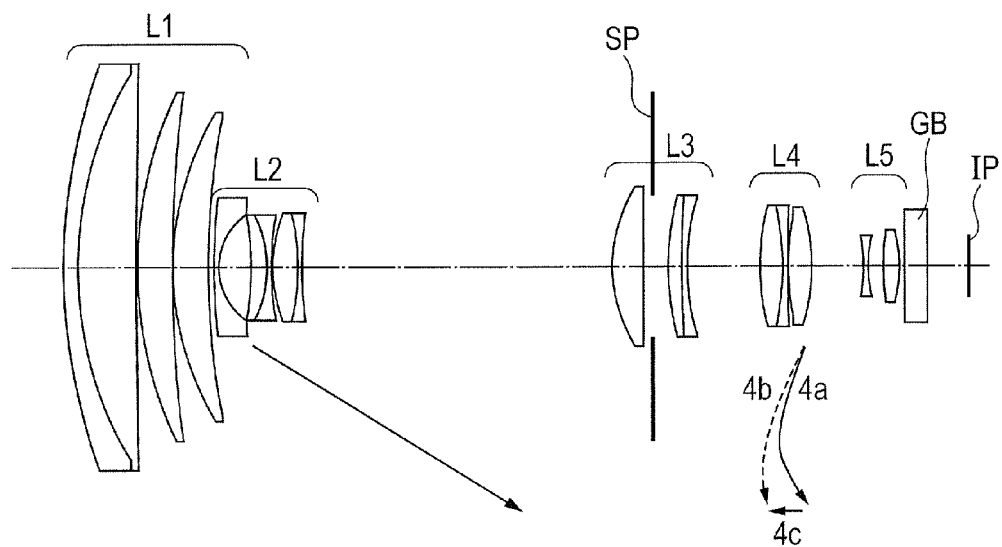
FIG. 5 is a cross-sectional view of a lens according to Example 3 of the present invention.
Figure 6A:
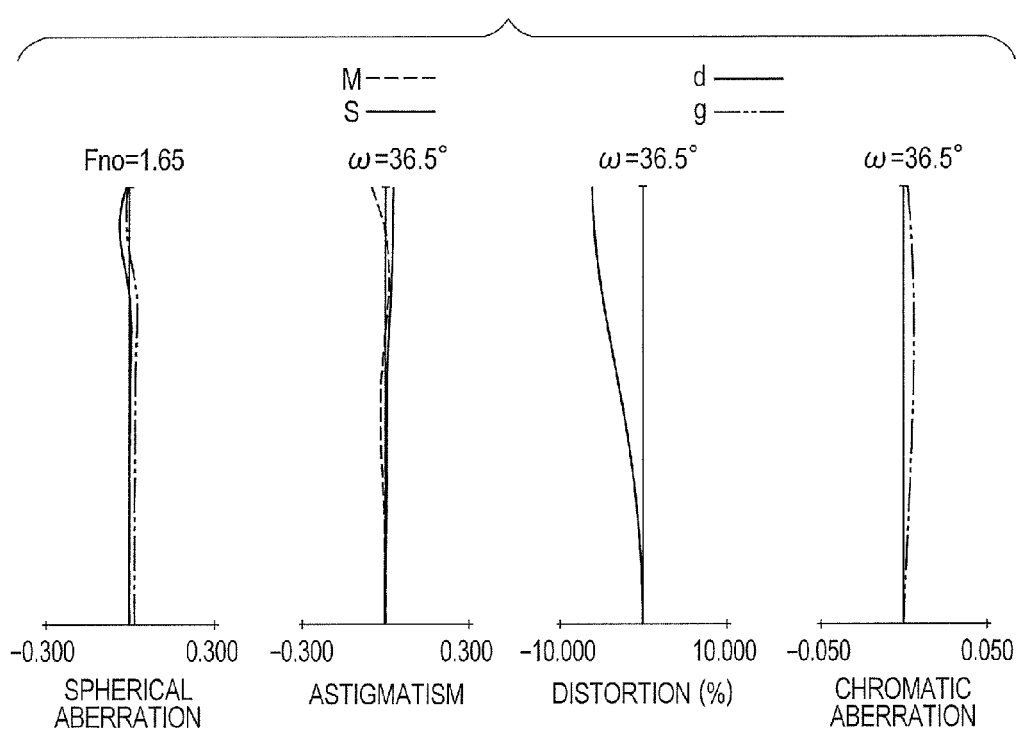
FIG. 6A is an aberration diagram at a wide angle end of the lens of Example 3.

FIG. 5 illustrates a lens cross section at a wide angle end of a zoom lens according to Example 3 of the present invention. FIGS. 6A, 6B, and 6C are aberration diagrams at a wide angle end, an intermediate zoom position, and a telephoto end, respectively, of the zoom lens of Example 3. The zoom lens of Example 3 has a zoom ratio of 39.50 and an aperture ratio (F number) of 1.65 to 5.60.

Figure 7:
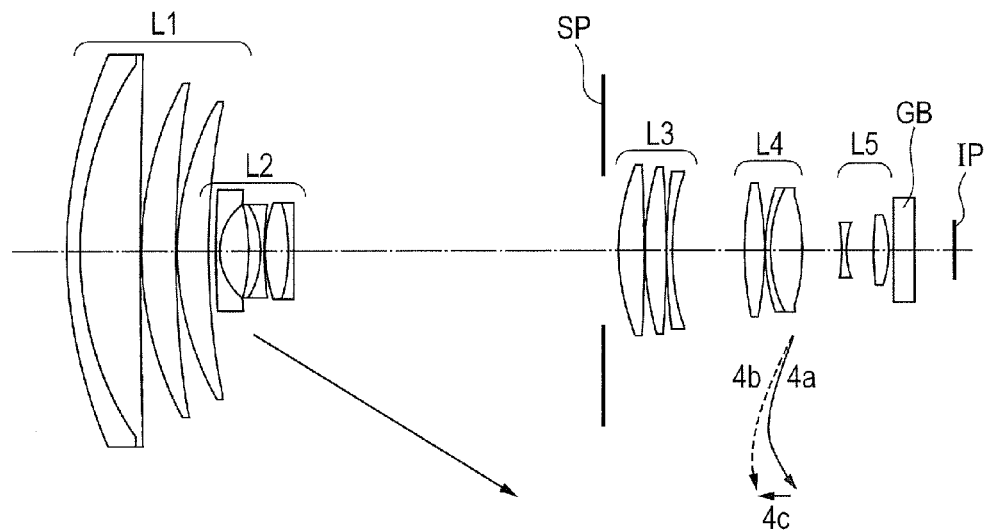
FIG. 7 is a cross-sectional view of a lens according to Example 4 of the present invention.
Figure 8A:
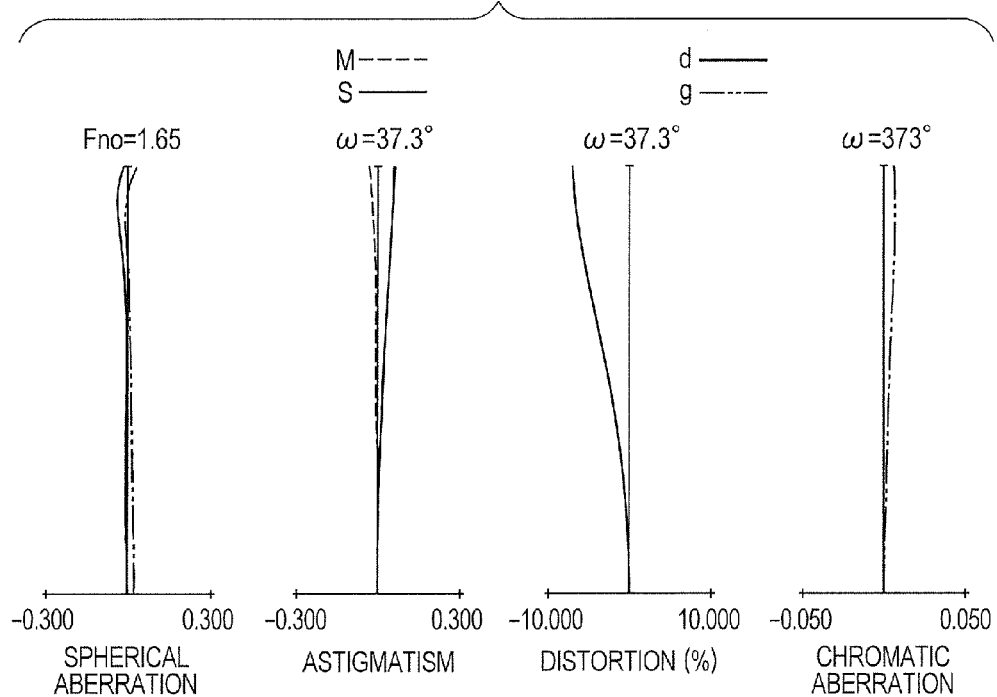
FIG. 8A is an aberration diagram at a wide angle end of the lens of Example 4.
Figure 8B:
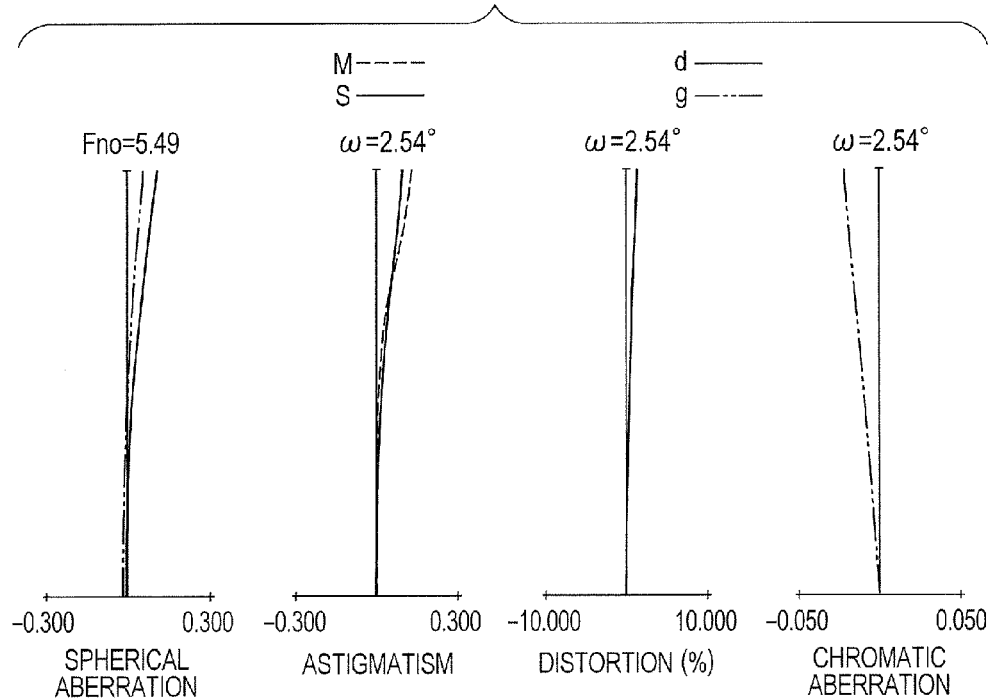
FIG. 8B is an aberration diagram at an intermediate zoom position of the lens of Example 4.
Figure 8C:
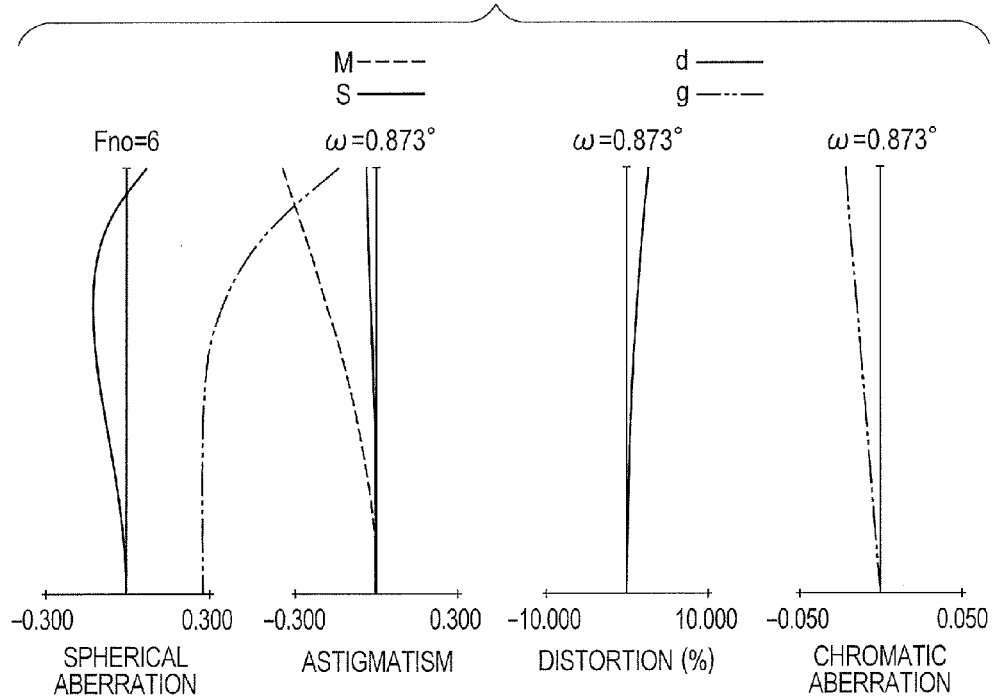
FIG. 8C is an aberration diagram at a telephoto end of the lens of Example 4.

FIG. 7 illustrates a lens cross section at a wide angle end of a zoom lens according to Example 4 of the present invention. FIGS. 8A, 8B, and 8C are aberration diagrams at a wide angle end, an intermediate zoom position, and a telephoto end, respectively, of the zoom lens of Example 4. The zoom lens of Example 4 has a zoom ratio of 45.10 and an aperture ratio (F number) of 1.65 to 6.00.

Figure 9:
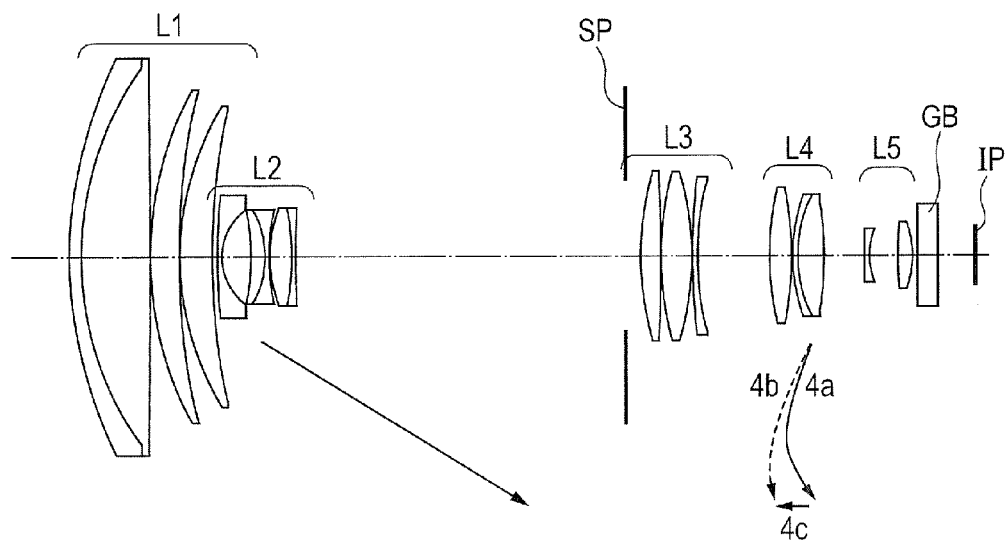
FIG. 9 is a cross-sectional view of a lens according to Example 5 of the present invention.
Figure 10A:
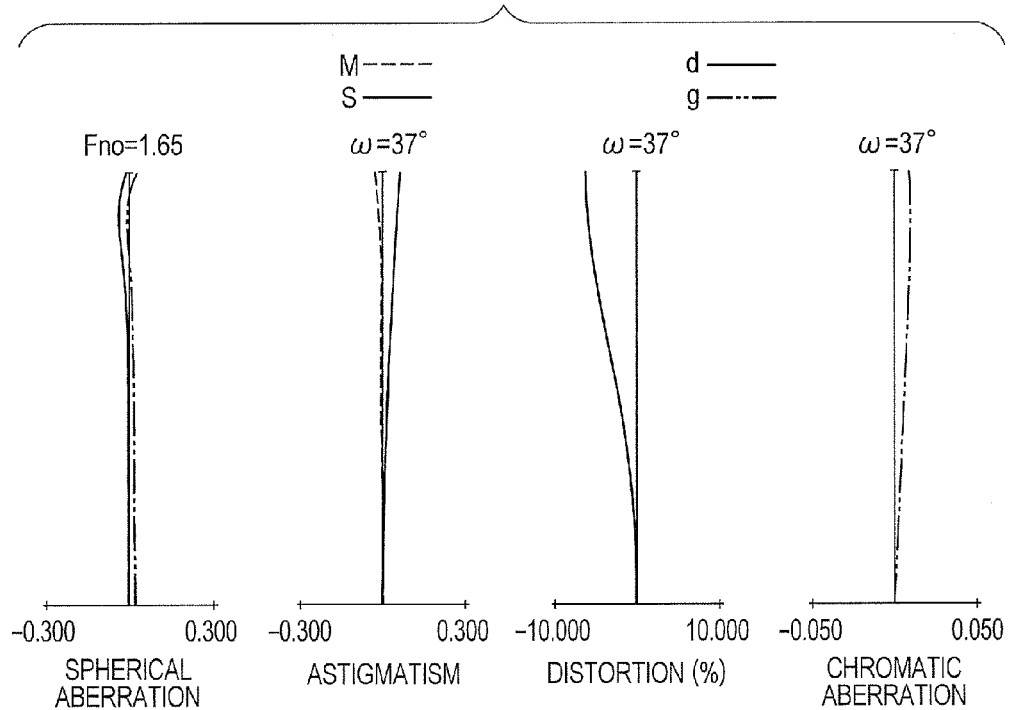
FIG. 10A is an aberration diagram at a wide angle end of the lens of Example 5.
Figure 10B:
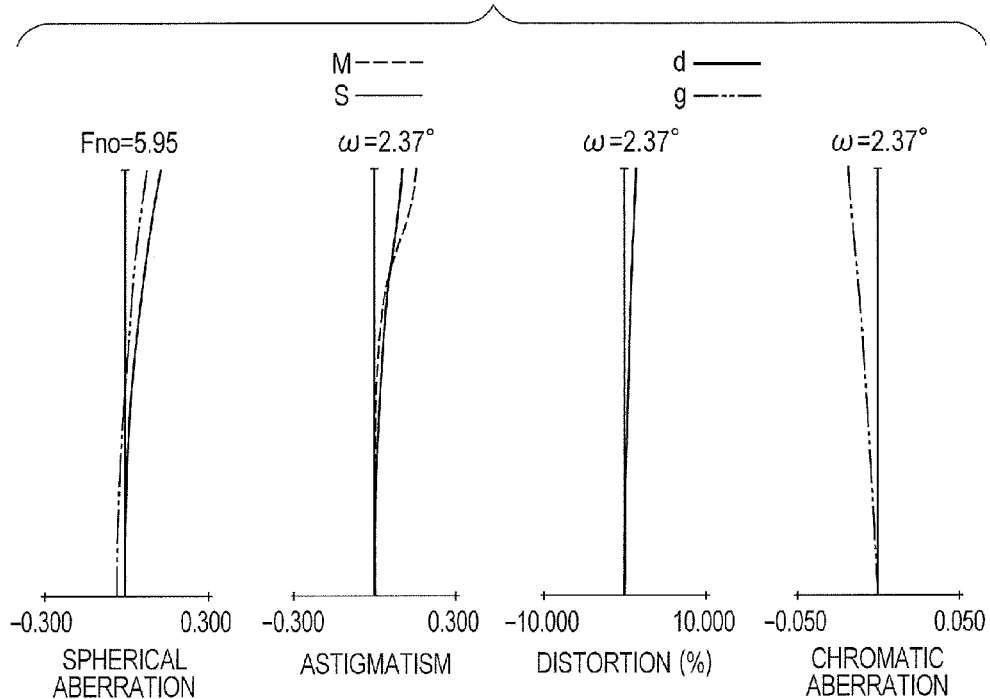
FIG. 10B is an aberration diagram at an intermediate zoom position of the lens of Example 5.
Figure 10C:
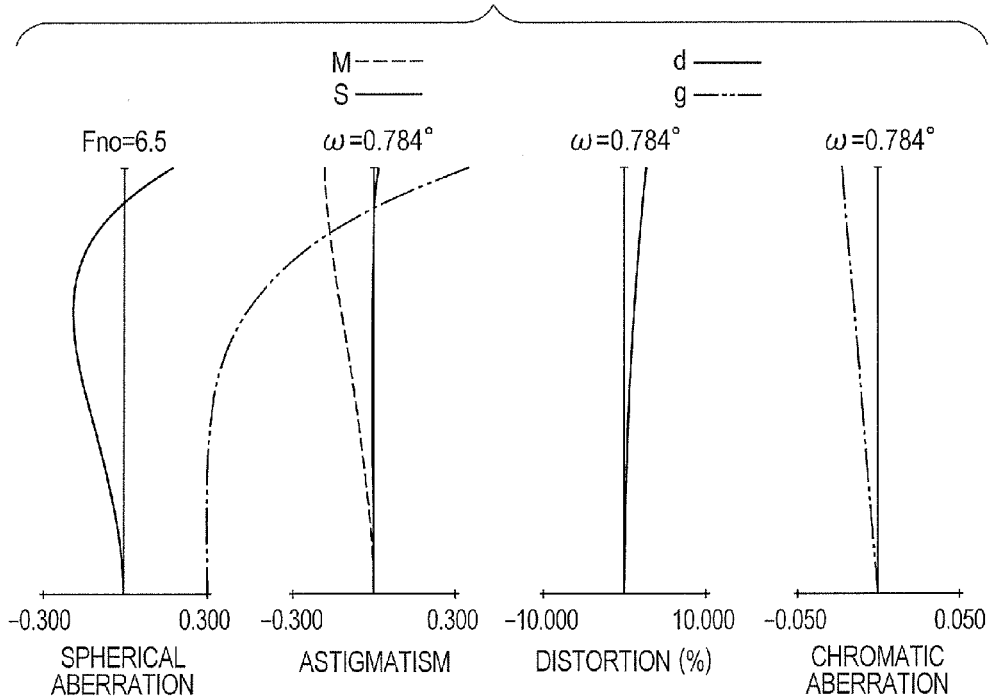
FIG. 10C is an aberration diagram at a telephoto end of the lens of Example 5.

FIG. 9 illustrates a lens cross section at a wide angle end of a zoom lens according to Example 5 of the present invention. FIGS. 10A, 10B, and 10C are aberration diagrams at a wide angle end, an intermediate zoom position, and a telephoto end, respectively, of the zoom lens of Example 5. The zoom lens of Example 5 has a zoom ratio of 50.09 and an aperture ratio (F number) of 1.65 to 6.50.

Figure 11:
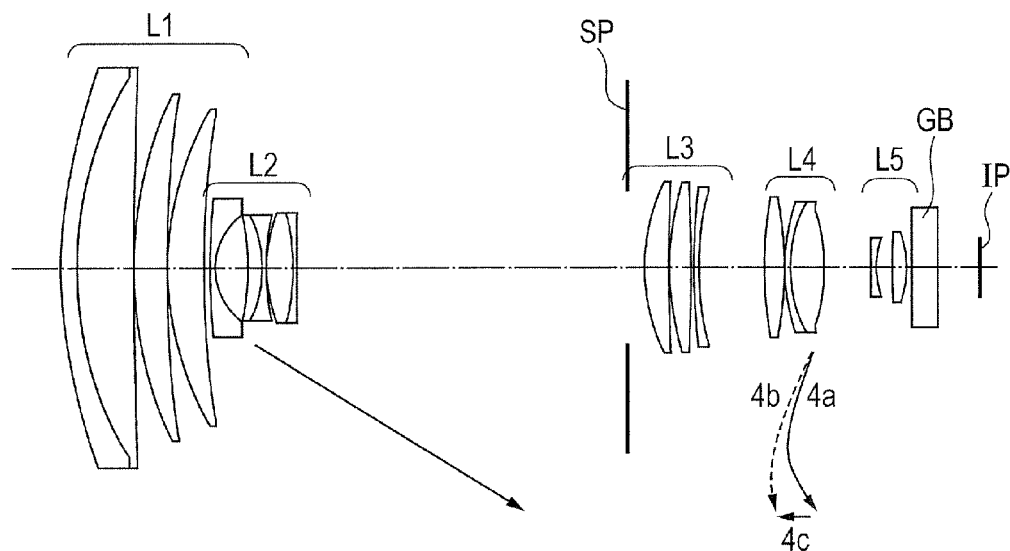
FIG. 11 is a cross-sectional view of a lens according to Example 6 of the present invention.
Figure 12A:
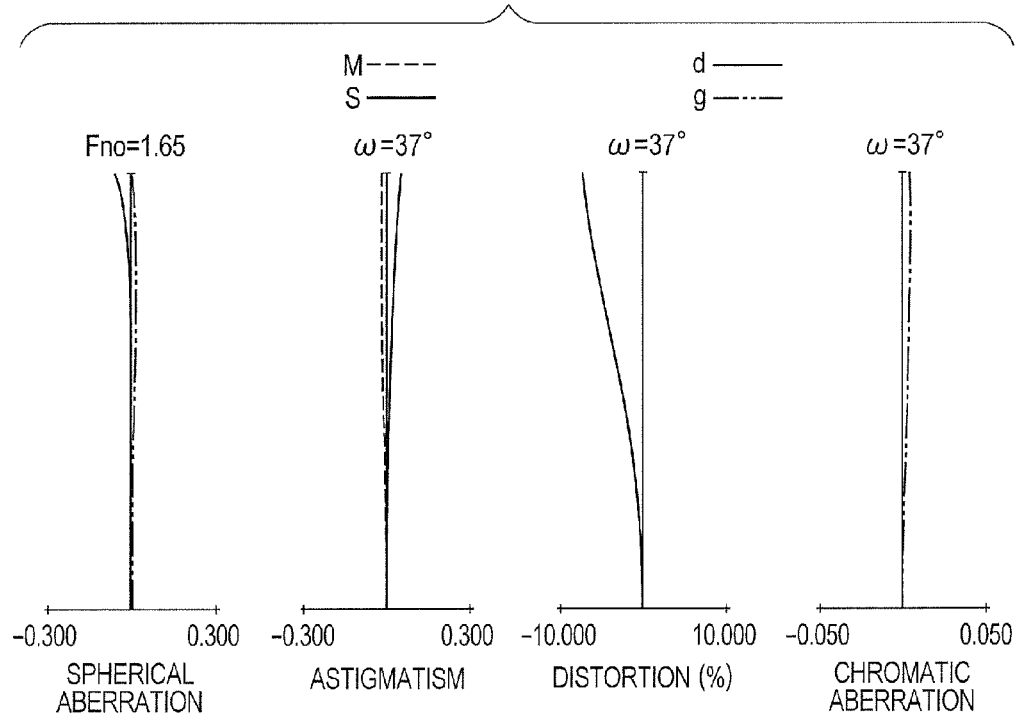
FIG. 12A is an aberration diagram at a wide angle end of the lens of Example 6.
Figure 12B:
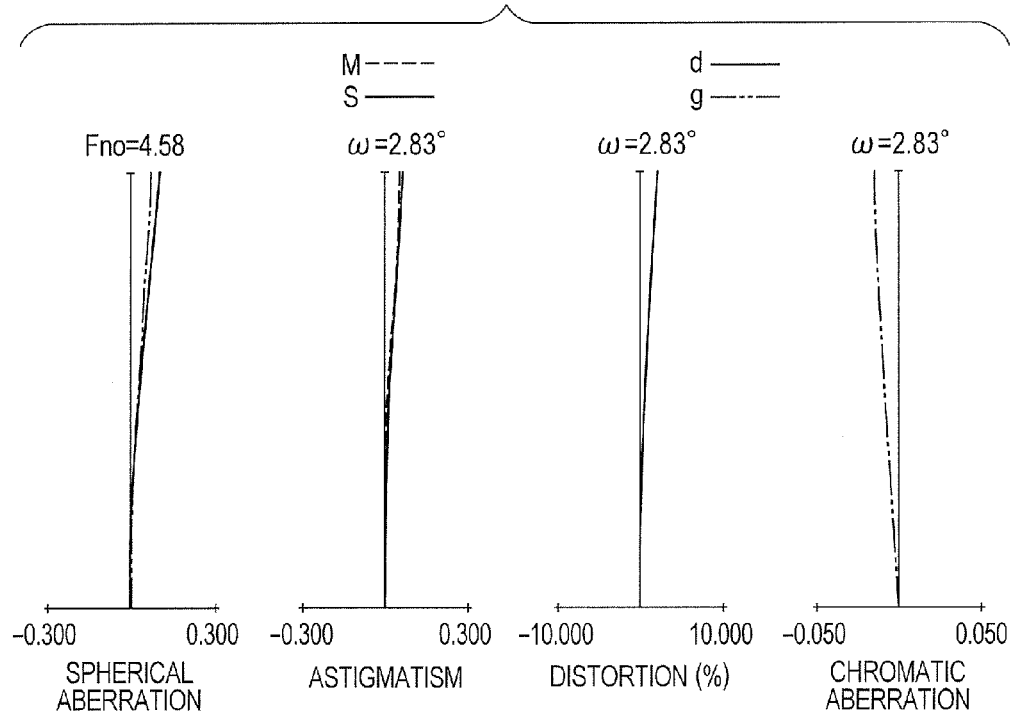
FIG. 12B is an aberration diagram at an intermediate zoom position of the lens of Example 6.
Figure 12C:
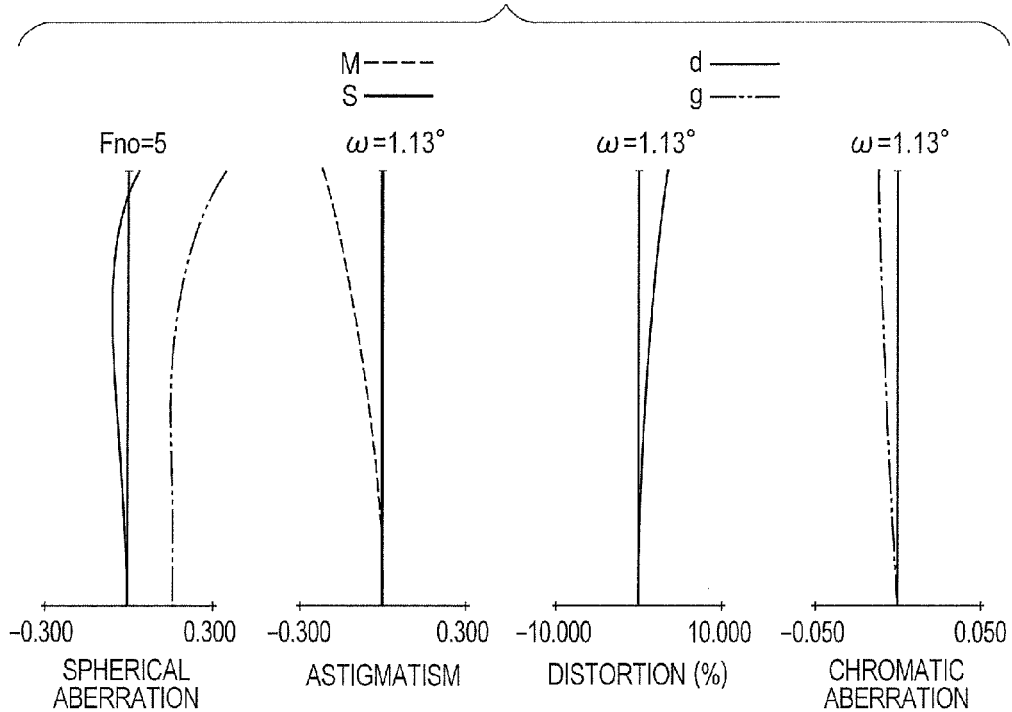
FIG. 12C is an aberration diagram at a telephoto end of the lens of Example 6.
Figure 13:
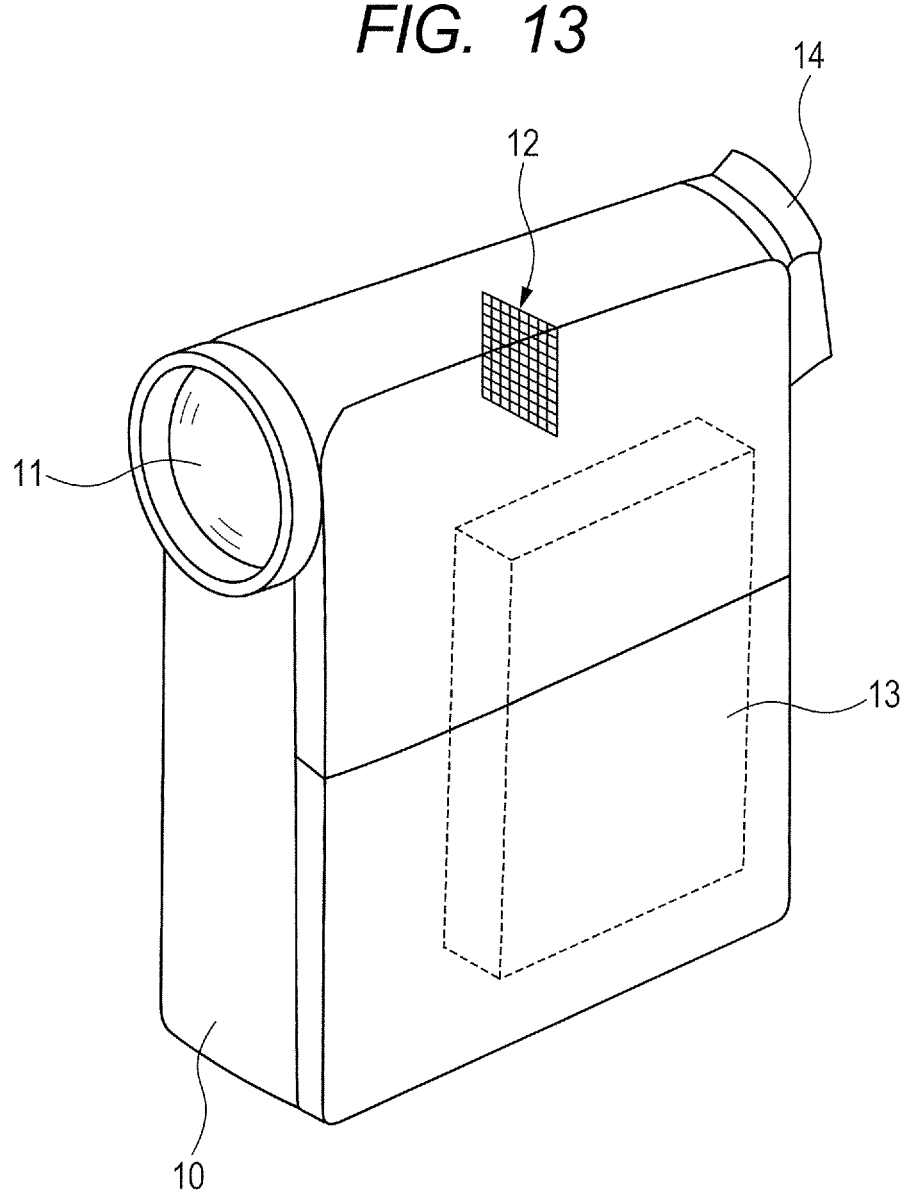
FIG. 13 is a schematic perspective view of a main section of an image pickup apparatus according to one embodiment of the present invention.

FIG. 11 illustrates a lens cross section at a wide angle end of a zoom lens according to Example 6 of the present invention. FIGS. 12A, 12B, and 12C are aberration diagrams at a wide angle end, an intermediate zoom position, and a telephoto end, respectively, of the zoom lens of Example 6. The zoom lens of Example 6 has a zoom ratio of 34.09 and an aperture ratio (F number) of 1.65 to 5.00. FIG. 13 is a schematic perspective view of a main part of an image pickup apparatus according to the present invention.

The zoom lens of the present invention is used for an image pickup apparatus such as a digital camera, a video camera, and a silver-halide film camera. In the lens cross sections, the left side is a front side (object side or magnification side) while the right side is a rear side (image side or reduction side). In the lens cross sections, symbol i indicates an order of lens units from the object side to the image side, and symbol L1 represents an i-th lens unit.

In the lens cross section of each example, the zoom lens includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. An F number determination member (hereinafter referred to also as an "aperture stop") SP has a function of aperture stop for determining (limiting) a maximum F number (Fno) light flux. The F number determination member SP is arranged on the object side of the third lens unit L3.

An optical block GB corresponds to an optical filter, a face plate, a quartz low-pass filter, an infrared cut filter, or the like. As an image plane IP, an imaging plane of an image pickup element (photo-electric conversion element) such as a CCD sensor and a CMOS sensor is arranged when the zoom lens is used as an imaging optical system such as a video camera and a digital still camera. Alternatively, a photosensitive surface corresponding to a film surface is arranged when the zoom lens is used as an imaging optical system of a silver-halide film camera.

In spherical aberration diagrams of the aberration diagrams, a solid line indicates a d-line, and a two-dot chain line indicates a g-line. In the astigmatism diagrams of the aberration diagrams, a dotted line indicates a meridional image plane, and a solid line indicates a sagittal image plane. A chromatic aberration of magnification is represented by the g-line. Symbol Fno represents an F number, and symbol w represents a half field angle (degree). The half field angle ω represents a value obtained from a ray tracing value. In the lens cross-sectional views, an arrow indicates a movement locus of each of the lens units during the zooming from the wide angle end to the telephoto end. During the zooming, the second lens unit L2 and the fourth lens unit L4 are moved.

In the following examples, the wide angle end and the telephoto end respectively mean zoom positions when a variable magnification lens unit is located at one end and the other end in a range in which the variable magnification lens unit is mechanically movable on an optical axis. In each of the examples, during the zooming from the wide angle end to the telephoto end, the magnification is varied by moving the second lens unit L2 to the image side as indicated by the arrow. In addition, image plane variation accompanying the varying magnification is corrected by moving the fourth lens unit L4 to the object side so as to draw a convex locus.

In addition, a rear focus type is adopted, in which the fourth lens unit L4 is moved on the optical axis for performing focusing. A solid line curve 4a and a dotted line curve 4b concerning the fourth lens unit L4 indicate movement loci for correcting image plane variation accompanying the varying magnification when focusing at infinity and focusing at a short distance are performed, respectively. In this way, the fourth lens unit L4 is moved along a locus convex toward the object side, and hence a space between the third lens unit L3 and the fourth lens unit L4 can be used effectively, and reduction of the total lens length (distance from the first lens surface to the image plane) is achieved effectively.

In addition, when focusing from infinity to a short distance is performed at the telephoto end, the fourth lens unit L4 is moved to the front side as indicated by an arrow 4c. The aperture stop SP does not move during the zooming.

The zoom lens of each of the examples comprises, in order from the object side to the image side, the first lens unit L1 having the positive refractive power, the second lens unit L2 having the negative refractive power, the third lens unit L3 having the positive refractive power, the fourth lens unit L4 having the positive refractive power, and the fifth lens unit L5 having the negative refractive power. By adopting this structure, the downsizing and the high zoom ratio of the entire system are ensured.

During the zooming from the wide angle end to the telephoto end, the first lens unit L1, the third lens unit L3, and the fifth lens unit L5 do not move. Only the two lens units move during the zooming and the focusing. In this way, the mechanical structure is simplified and the entire zoom lens is easily downsized. The fifth lens unit L5 includes, in order from the object side to the image side, the partial unit L5n having the negative refractive power and the partial unit L5p having the positive refractive power with the widest air gap as a boundary therebetween.

The partial unit L5n having the negative refractive power of the fifth lens unit L5 is arranged closest to the object side, and hence even when the positive refractive power of the fourth lens unit L4 which moves during the focusing is increased, the back focus having a suitable length is obtained. In addition, the total lens length is shortened so that a movement amount in the entire zoom range of the fourth lens unit L4 becomes smaller. Moreover, the partial unit L5p having the positive refractive power is arranged on the image side of the partial unit L5n of the fifth lens unit L5, and hence an exit pupil position is set to a desired distant position, to thereby easily correct an incident angle of a light beam entering the image pickup element.

A total lens length is represented by TL, a focal length of the entire system at the telephoto end is represented by ft, a focal length of the second lens unit L2 is represented by f2, a focal length of the fourth lens unit L4 is represented by f4, and a focal length of the partial unit L5n is represented by f5n. The total lens length means a value which is obtained by adding the value of the back focus to a distance from the first lens surface to the final lens surface. The back focus is a value of an air-converted distance from the final lens surface to the image plane. In this case, the following conditional expressions are satisfied.

$$1.70 < ft/TL < 2.50 \quad (1)$$

$$23 < ft/|f2| < 100 \quad (2)$$

$$1.0 < f4/|f5n| < 5.0 \quad (3)$$

Next, the technical meanings of the conditional expressions (1), (2), and (3) are described. The conditional expression (1) defines a ratio of the focal length of the entire system at the telephoto end to the total lens length of the zoom lens. When the total lens length of the zoom lens becomes short and exceeds an upper limit of the conditional expression (1), in order to obtain the high zoom ratio, the refractive powers of the lens units become too strong. Therefore, the various aberrations such as the spherical aberration and the field curvature increase, and hence those various aberrations become difficult to correct. On the other hand, when the total lens length of the zoom lens becomes long and exceeds a lower limit of the conditional expression (1), the entire zoom lens becomes difficult to downsize.

The conditional expression (2) defines a ratio of the focal length of the entire system at the telephoto end to an absolute value of the focal length of the second lens unit L2. When the negative refractive power of the second lens unit L2 becomes too strong and exceeds an upper limit of the conditional expression (2), a Petzval sum negatively increases and hence the field curvature becomes difficult to correct. On the other hand, when the negative refractive power of the second lens unit L2 becomes insufficient and exceeds a lower limit of the conditional expression (2), in order to obtain the desired zoom ratio, the movement amount of the second lens unit L2 becomes longer, and hence the entire system becomes larger.

The conditional expression (3) defines a ratio of the focal length of the fourth lens unit L4 to an absolute value of the focal length of the partial unit L5n having the negative refractive power, which is located closest to the object side in the fifth lens unit L5. When the positive refractive power of the fourth lens unit L4 becomes insufficient and exceeds an upper limit of the conditional expression (3), the movement amount of the fourth lens unit L4 for the focusing over the entire zoom range becomes longer, and hence the total lens length becomes longer. In addition, because the negative refractive power of the partial unit L5n located closest to the object side within the fifth lens unit L5 becomes too strong, the Petzval sum negatively increases and hence the field curvature becomes difficult to correct.

On the other hand, when the positive refractive power of the fourth lens unit L4 becomes strong and exceeds a lower limit of the conditional expression (3), the variation of the coma accompanying the zooming becomes larger, and hence the coma becomes difficult to correct.

It is more preferred to set the numerical value ranges of the conditional expressions (1) to (3) as follows.

$$1.75 < ft/TL < 2.30 \quad (1a)$$

$$25 < ft/|f2| < 50 \quad (2a)$$

$$1.5 < f4/|f5n| < 3.0 \quad (3a)$$

By adopting the structure described above, the zoom lens is obtained, which is compact in the entire system and which has the high zoom ratio and the high optical characteristic over the entire zoom range. However, it is more preferred to satisfy one or more of the following conditional expressions.

The movement amount of the second lens unit L2 during the zooming from the wide angle end to the telephoto end is represented by BL2 str. Herein, the movement amount means a difference between a position on the optical axis of the lens unit at the wide angle end and a position on the optical axis of the lens unit at the telephoto end. The sign of the movement amount is set positive when the lens unit is located on the image side at the telephoto end with respect to the wide angle end, and is set negative when the lens unit is located on the object side at the telephoto end with respect to the wide angle end. An interval on the optical axis between the partial unit L5n and the partial unit L5p is represented by L5d, and a distance (lens unit thickness) on the optical axis from the lens surface of the fifth lens unit L5 closest to the object side to the lens surface thereof closest to the image side is represented by D5. A focal length of the partial unit L5p is represented by f5p. In this case, it is preferred to satisfy one or more of the following conditional expressions.

$$4.0 < BL2str/|f2| < 10.0 \quad (4)$$

$$0.3 < L5d/D5 < 0.9 \quad (5)$$

$$1.0 < f5p/|f5n| < 3.0 \quad (6)$$

Next, the technical meanings of the conditional expressions (4), (5), and (6) are described.

The conditional expression (4) defines a ratio of the movement amount of the second lens unit L2 during the zooming from the wide angle end to the telephoto end to the absolute value of the focal length of the second lens unit L2. When the movement amount of the second lens unit L2 becomes too large and exceeds an upper limit of the conditional expression (4), the total lens length becomes longer. On the other hand, when the movement amount of the second lens unit L2 becomes too small and exceeds a lower limit of the conditional expression (4), the desired zoom ratio becomes difficult to obtain.

The conditional expression (5) defines a ratio of an air gap between the partial unit L5n and the partial unit L5p of the fifth lens unit L5 to a lens unit thickness of the fifth lens unit L5. When the lens unit thickness of the fifth lens unit L5 becomes too small and exceeds an upper limit of the conditional expression (5), the lens thickness of each of the lenses constructing the fifth lens unit L5 becomes smaller. As a result, the lenses constructing the fifth lens unit L5 become difficult to manufacture.

On the other hand, when the air gap between the partial unit L5n and the partial unit L5p of the fifth lens unit L5 narrows and exceeds a lower limit of the conditional expression (5), in order for a light beam to enter the partial unit L5p at a suitable incidence height, the negative refractive power of the partial unit L5n becomes too strong. In addition, the variation in field curvature and the coma during zooming increases and hence the various aberrations become difficult to correct.

The conditional expression (6) defines a ratio of the focal length of the partial unit L5p to the focal length of the partial unit L5n in the fifth lens unit L5. When the negative refractive power of the partial unit L5n becomes strong (an absolute value of the negative refractive power becomes large) and exceeds an upper limit of the conditional expression (6), the variation in field curvature and the coma during zooming increases and hence the various aberrations become difficult to correct.

On the other hand, when the negative refractive power of the partial unit L5n becomes weak (the absolute value of the negative refractive power becomes small) and exceeds a lower limit of the conditional expression (6), a light flux which is strongly converged in the fourth lens unit L4 becomes difficult to sufficiently diffuse. As a result, the positive refractive power of the fourth lens unit L4 is forced to be weakened, and hence the total lens length increases. It is more preferred to set the numerical value ranges of the conditional expressions (4) to (6) as follows.

$$4.2 < BL2str/|f2| < 8.0 \quad (4a)$$

$$0.4 < L5d/D5 < 0.8 \quad (5a)$$

$$1.5 < f5p/|f5n| < 2.5 \quad (6a)$$

In addition, the conditional expressions (1), (2), and (4) greatly relate to the zoom ratio of the zoom lens. Thus, when a high zoom ratio of 39 or more is desired to be ensured, it is more preferred to set the numerical value ranges of the conditional expressions (1), (2), and (4) as follows.

$$1.90 < ft/TL < 2.40 \quad (1b)$$

$$30 < ft/|f2| < 100 \quad (2b)$$

$$4.5 < BL2str/|f2| < 8.0 \quad (4b)$$

In each of the examples described above, although the partial unit L5n includes the single negative lens, and the partial unit L5p includes the single positive lens, each of the partial unit L5n and the partial unit L5p may include a cemented lens. In addition, in each of the examples described above, it is preferred to structure each of the lens units as follows.

It is preferred that the first lens unit L1 include, in order from the object side to the image side, a cemented lens which is obtained by cementing a negative lens and a positive lens, a positive lens, and a positive lens. With this structure, the high optical characteristic is easily obtained over the entire zoom range. It is preferred that the second lens unit L2 include, in order from the object side to the image side, a negative lens, a cemented lens which is obtained by cementing a positive lens and a negative lens, and a cemented lens which is obtained by cementing a positive lens and a negative lens. With this structure, the aberration variation during the zooming is easily reduced.

It is preferred that the third lens unit L3 include, in order from the object side to the image side, a positive lens, a positive lens, and a negative lens. With this structure, the high optical characteristic is easily obtained over the entire zoom range. It is preferred that the fourth lens unit L4 include, in order from the object side to the image side, a positive lens and a cemented lens which is obtained by cementing a negative lens and a positive lens, or include, in order from the object side to the image side, a cemented lens which is obtained by cementing a positive lens and a negative lens, and a positive lens. With this structure, the aberration variation during the focusing is easily reduced.

Note that, in the image pickup apparatus including the zoom lens of each of the examples, and an image pickup element for receiving light of an image formed by the zoom lens, a half of a length of a diagonal line of an effective imaging area of the image pickup element is represented by hmax. In this case, it is preferred to satisfy the following conditional expression.

$$27 < TL/h\max < 32 \quad (7)$$

The conditional expression (7) defines a ratio of the total lens length of the zoom lens to a maximum height (a half of a length of a diagonal line of an effective imaging area) of a range of use of the image pickup element when the zoom lens of the present invention is applied to an image pickup apparatus including an image pickup element.

When the total lens length of the zoom lens becomes too long and exceeds an upper limit of the conditional expression (7), the entire zoom lens becomes difficult to downsize. On the other hand, when the total lens length of the zoom lens becomes too short and exceeds a lower limit of the conditional expression (7), in order to obtain the high zoom ratio, the refractive power of each of the lens units becomes too strong. As a result, the various aberrations such as the spherical aberration and the field curvature increase, and hence those various aberrations become difficult to correct. It is more preferred to set the numerical value range of the conditional expression (7) as follows.

$$27.10 < TL/h\max < 31.80 \quad (7a)$$

Next, a video camera (image pickup apparatus) including the zoom lens of the present invention as an imaging optical system according to one embodiment of the present invention is described with reference to FIG. 13. In FIG. 13, the video camera includes a video camera main body 10, an imaging optical system 11 including the zoom lens of the present invention, an image pickup element 12 such as a CCD for receiving light of a subject image by the imaging optical system 11, and a recording unit 13 for recording data on the light of the subject image received by the image pickup element 12. A finder 14 is used for observing the subject image displayed on a display element (not shown). The display element includes a liquid crystal panel and the like, and the subject image formed on the image pickup element 12 is displayed on the display element.

By applying the zoom lens of the present invention to the video camera in such a manner, the compact image pickup apparatus having the high optical characteristic can be realized. Note that, if a solid-state image pickup element such as a CCD is used as the image pickup element, then, the aberration is electronically corrected, to thereby enable the image quality of the output image to be more enhanced.

Although the exemplary embodiments of the present invention have been described so far, the present invention is by no means limited to those embodiments, and hence various changes and modifications can be made within the subject matter of the present invention. As described above, according to the examples of the present invention, the zoom lens which is compact in the entire system, and which has the high zoom ratio and the high optical characteristic over the entire zoom range, and the image pickup apparatus which includes the zoom lens and is compatible with a larger image pickup element can be obtained.

Next, Numerical Examples 1 to 6 are described, which correspond to Examples 1 to 6 of the present invention, respectively. In each of Numerical Examples 1 to 6, symbol i represents the order of a surface from an object. Symbol ri represents a curvature radius of an i-th surface in order from the object side, symbol di represents a lens thickness and an air gap between an i-th surface and an (i+1)th surface in order from the object side, and symbols ndi and vdi represent a refractive index and an Abbe number of a material of an optical member between the i-th surface and the (i+1)th surface in order from the object side, respectively. In addition, two surfaces closest to the image side are made of a glass material such as a face plate.

Symbol r16 in Numerical Examples 1, 2, and 4 to 6 represents a dummy surface which is used in design, and does not structure the zoom lens. An aspherical shape is expressed by the expression below.

$$X = \frac{(1/R)H^2}{1+\sqrt{1-(1+K)(H/R)^2}} + A4 \times H^4 + A6 \times H^6 + A8 \times H^8 + A10 \times H^{10}$$

where the X axis corresponds to the optical axis direction, the H axis corresponds to the direction perpendicular to the optical axis, the light propagation direction is positive, symbol R represents a paraxial curvature radius, symbol K represents a conic constant, and symbols A4, A6, A8, and A10 represent aspherical coefficients, respectively.

In addition, * means a surface having an aspherical shape, and [e-x] means ×10$^{-x}$. Symbol BF is back focus, which is represented by an air-converted length from a final lens surface to an image plane. A calculation result of each of the conditional expressions based on each of Numerical Examples is shown in Table 1.

(Numerical Example 1)

| Unit mm | | | | |
|---|---|---|---|---|
| Surface data | | | | |
| Surface number | r | d | nd | vd |
| 1 | 65.262 | 1.30 | 1.85478 | 24.8 |
| 2 | 39.039 | 5.29 | 1.49700 | 81.5 |
| 3 | 880.122 | 0.10 | | |
| 4 | 41.278 | 3.36 | 1.49700 | 81.5 |
| 5 | 152.845 | 0.10 | | |
| 6 | 28.647 | 3.25 | 1.58694 | 71.0 |
| 7 | 69.803 | (Variable) | | |
| 8 | 88.111 | 0.45 | 2.00100 | 29.1 |
| 9 | 6.140 | 2.90 | | |
| 10 | −18.672 | 1.42 | 1.95796 | 17.3 |
| 11 | −9.198 | 0.40 | 2.00102 | 29.8 |
| 12 | 33.629 | 0.10 | | |
| 13 | 16.312 | 2.07 | 1.95906 | 17.5 |
| 14 | −24.890 | 0.40 | 2.00455 | 29.1 |
| 15 | 13419.812 | (Variable) | | |
| 16 | ∞ | 0.80 | | |
| 17 (Stop) | ∞ | 1.50 | | |
| 18* | 15.180 | 3.04 | 1.69350 | 53.2 |
| 19* | −1969.691 | 0.10 | | |
| 20 | 24.045 | 2.01 | 1.49672 | 81.5 |
| 21 | 441.654 | 0.10 | | |
| 22 | 32.050 | 0.60 | 1.98036 | 21.9 |
| 23 | 18.046 | (Variable) | | |
| 24* | 31.212 | 1.22 | 1.55332 | 71.7 |
| 25 | −98.288 | 0.10 | | |
| 26 | 16.868 | 0.50 | 1.95906 | 17.5 |
| 27 | 12.489 | 2.81 | 1.49700 | 81.5 |
| 28 | −24.060 | (Variable) | | |
| 29 | −32.610 | 0.50 | 1.94026 | 35.6 |
| 30 | 10.653 | 2.02 | | |
| 31 | 29.525 | 1.07 | 1.80897 | 22.6 |
| 32 | −26.791 | 0.50 | | |
| 33 | ∞ | 2.20 | 1.51600 | 64.2 |
| 34 | ∞ | 3.89 | | |
| Image plane | ∞ | | | |

| Aspherical surface data |
|---|

Eighteenth surface

K = 0.00000e+000 A4 = −4.38453e−005 A6 = −2.40441e−007
A8 = 2.40506e−010 A10 = −1.16249e−011

Nineteenth surface

K = 0.00000e+000 A4 = 8.67343e−006 A6 = −1.80311e−007

Twenty-fourth surface

K = 0.00000e+000 A4 = −1.13076e−004 A6 = −4.92731e−007
A8 = 1.22044e−008 A10 = 4.38368e−011

| Various data | | | |
|---|---|---|---|
| Zoom ratio 39.50 | | | |
| Focal length | 4.28 | 62.64 | 168.90 |
| F number | 1.65 | 5.13 | 5.60 |
| Half field angle (degree) | 35.05 | 2.74 | 1.02 |
| Image height | 3.00 | 3.00 | 3.00 |
| Total lens length | 85.53 | 85.53 | 85.53 |
| BF | 5.84 | 5.84 | 5.84 |
| d 7 | 0.65 | 26.53 | 30.06 |
| d15 | 29.60 | 3.73 | 0.20 |
| d23 | 8.28 | 3.00 | 11.41 |
| d28 | 3.62 | 8.90 | 0.49 |

| Zoom lens unit data | | |
|---|---|---|
| Unit | First surface | Focal length |
| 1 | 1 | 41.56 |
| 2 | 8 | −5.36 |

-continued

Unit mm

| | | |
|---|---|---|
| 3 | 16 | 21.76 |
| 4 | 24 | 16.19 |
| 5 | 29 | −22.47 |
| 6 | 33 | ∞ |

(Numerical Example 2)

Unit mm

Surface data

| Surface number | r | d | nd | vd |
|---|---|---|---|---|
| 1 | 64.743 | 1.30 | 1.85478 | 24.8 |
| 2 | 39.039 | 5.31 | 1.49700 | 81.5 |
| 3 | 1082.905 | 0.10 | | |
| 4 | 41.036 | 3.37 | 1.49700 | 81.5 |
| 5 | 155.293 | 0.10 | | |
| 6 | 28.575 | 3.23 | 1.57595 | 73.2 |
| 7 | 70.577 | (Variable) | | |
| 8 | 107.817 | 0.45 | 2.00100 | 29.1 |
| 9 | 6.284 | 2.86 | | |
| 10 | −17.096 | 1.38 | 1.96260 | 17.2 |
| 11 | −9.005 | 0.40 | 1.99702 | 30.2 |
| 12 | 38.879 | 0.10 | | |
| 13 | 17.364 | 2.08 | 1.95906 | 17.5 |
| 14 | −21.471 | 0.40 | 1.99947 | 29.7 |
| 15 | 64286.794 | (Variable) | | |
| 16 | ∞ | 0.80 | | |
| 17 (Stop) | ∞ | 1.50 | | |
| 18* | 15.571 | 2.97 | 1.69350 | 53.2 |
| 19* | −1612.945 | 0.10 | | |
| 20 | 25.010 | 1.94 | 1.53826 | 75.9 |
| 21 | 357.658 | 0.10 | | |
| 22 | 30.103 | 0.60 | 1.98074 | 21.8 |
| 23 | 18.142 | (Variable) | | |
| 24* | 28.511 | 1.31 | 1.55332 | 71.7 |
| 25 | −105.864 | 0.10 | | |
| 26 | 17.838 | 0.50 | 1.95906 | 17.5 |
| 27 | 12.863 | 2.69 | 1.49700 | 81.5 |
| 28 | −25.752 | (Variable) | | |
| 29 | −20.696 | 0.50 | 1.97085 | 33.1 |
| 30 | 9.557 | 2.24 | | |
| 31 | 16.480 | 1.74 | 1.71139 | 29.5 |
| 32 | −14.202 | 0.50 | | |
| 33 | ∞ | 2.20 | 1.51600 | 64.2 |
| 34 | ∞ | 3.89 | | |
| Image plane | ∞ | | | |

Aspherical surface data

Eighteenth surface

K = 0.00000e+000 A4 = −4.05207e−005 A6 = −2.89504e−007
A8 = 1.24205e−009 A10 = −1.81816e−011
Nineteenth surface K = 0.00000e+000 A4 = 9.69470e−006 A6 = −1.98038e−007
Twenty-fourth surface K = 0.00000e+000 A4 = −1.08769e−004 A6 = 4.01759e−007
A8 = −2.93577e−008 A10 = 6.47990e−010

Various data
Zoom ratio 39.49

| | | | |
|---|---|---|---|
| Focal length | 4.28 | 63.65 | 168.87 |
| F number | 1.65 | 5.13 | 5.60 |
| Half field angle (degree) | 35.05 | 2.70 | 1.02 |
| Image height | 3.00 | 3.00 | 3.00 |
| Total lens length | 85.79 | 85.79 | 85.79 |
| BF | 5.84 | 5.84 | 5.84 |
| d 7 | 0.69 | 26.25 | 29.74 | 28.87 | 9.41 |
| d15 | 29.25 | 3.68 | 0.20 | 1.07 | 20.53 |

-continued

Unit mm

| | | | | | |
|---|---|---|---|---|---|
| d23 | 8.06 | 2.56 | 11.23 | 6.43 | 6.46 |
| d28 | 3.78 | 9.28 | 0.61 | 5.41 | 5.38 |

Zoom lens unit data

| Unit | First surface | Focal length |
|---|---|---|
| 1 | 1 | 41.19 |
| 2 | 8 | −5.27 |
| 3 | 16 | 21.24 |
| 4 | 24 | 16.71 |
| 5 | 29 | −51.61 |
| 6 | 33 | ∞ |

(Numerical Example 3)

Unit mm

Surface data

| Surface number | r | d | nd | vd |
|---|---|---|---|---|
| 1 | 55.318 | 1.30 | 2.00069 | 25.5 |
| 2 | 36.090 | 5.65 | 1.43875 | 94.9 |
| 3 | 615.719 | 0.10 | | |
| 4 | 40.208 | 3.31 | 1.57424 | 71.3 |
| 5 | 130.202 | 0.10 | | |
| 6 | 30.004 | 3.39 | 1.59522 | 67.7 |
| 7 | 84.292 | (Variable) | | |
| 8 | 64.552 | 0.45 | 2.00100 | 29.1 |
| 9 | 6.402 | 3.08 | | |
| 10 | −29.516 | 1.54 | 1.95906 | 17.5 |
| 11 | −11.005 | 0.40 | 2.00100 | 29.1 |
| 12 | 30.958 | 0.10 | | |
| 13 | 14.236 | 2.35 | 1.95906 | 17.5 |
| 14 | −27.994 | 0.40 | 1.99851 | 29.5 |
| 15 | 42.469 | (Variable) | | |
| 16* | 14.891 | 2.85 | 1.76802 | 49.2 |
| 17 | −87732.959 | 1.00 | | |
| 18 (Stop) | ∞ | 1.50 | | |
| 19* | 24.274 | 1.15 | 1.55332 | 71.7 |
| 20 | 86.770 | 0.60 | 2.00108 | 25.5 |
| 21 | 22.150 | (Variable) | | |
| 22 | 20.578 | 2.18 | 1.49700 | 81.5 |
| 23 | −30.515 | 0.50 | 1.97380 | 20.2 |
| 24 | 250.872 | 0.10 | | |
| 25* | 22.341 | 2.21 | 1.76802 | 49.2 |
| 26* | −21.274 | (Variable) | | |
| 27 | −17.195 | 0.50 | 2.00100 | 29.1 |
| 28 | 11.648 | 1.45 | | |
| 29 | 21.034 | 1.50 | 1.82115 | 24.1 |
| 30* | −15.279 | 0.50 | | |
| 31 | ∞ | 2.20 | 1.51600 | 64.2 |
| 32 | ∞ | 3.89 | | |
| Image plane | ∞ | | | |

Aspherical surface data

Sixteenth surface

K = −1.41886e+000 A4 = 4.53385e−005 A6 = −3.73336e−007
A8 = 9.91428e−011 A10 = 2.73869e−011
Nineteenth surface K = −5.19472e+000 A4 = −5.69575e−005 A6 = 1.13763e−006
A8 = 1.15575e−008 A10 = −3.74154e−010
Twenty-fifth surface K = −4.64870e+000 A4 = 8.09062e−005 A6 = −1.01317e−005
A8 = −1.19226e−007
Twenty-sixth surface K = 0.00000e+000 A4 = 1.70910e−004 A6 = −1.49125e−005
A8 = 5.11242e−008

| Unit mm |
| --- |
| Thirtieth surface |

K = −2.20777e+001 A4 = −9.66161e−004 A6 = 4.40442e−005
A8 = −2.03621e−006 A10 = 6.01770e−008

| Various data Zoom ratio 39.50 | | | |
| --- | --- | --- | --- |
| Focal length | 4.32 | 64.11 | 170.55 |
| F number | 1.65 | 5.13 | 5.60 |
| Half field angle (degree) | 34.79 | 2.68 | 1.01 |
| Image height | 3.00 | 3.00 | 3.00 |
| Total lens length | 85.33 | 85.33 | 85.33 |
| BF | 5.84 | 5.84 | 5.84 |
| d 7 | 0.50 | 25.93 | 29.40 |
| d15 | 29.60 | 4.17 | 0.70 |
| d21 | 6.86 | 1.91 | 11.20 |
| d26 | 4.83 | 9.79 | 0.50 |

| Zoom lens unit data | | |
| --- | --- | --- |
| Unit | First surface | Focal length |
| 1 | 1 | 41.15 |
| 2 | 8 | −5.55 |
| 3 | 16 | 24.36 |
| 4 | 22 | 14.00 |
| 5 | 27 | −36.42 |
| 6 | 31 | ∞ |

(Numerical Example 4)

| Unit mm | | | |
| --- | --- | --- | --- |
| Surface data | | | |
| Surface number | r | d | nd | vd |
| 1 | 51.137 | 1.30 | 2.00069 | 25.5 |
| 2 | 35.673 | 6.14 | 1.48675 | 94.9 |
| 3 | 940.518 | 0.10 | | |
| 4 | 37.403 | 3.52 | 1.49700 | 81.5 |
| 5 | 113.809 | 0.10 | | |
| 6 | 30.837 | 3.20 | 1.58008 | 69.9 |
| 7 | 77.739 | (Variable) | | |
| 8 | 93.819 | 0.45 | 2.00100 | 29.1 |
| 9 | 6.025 | 2.93 | | |
| 10 | −20.462 | 1.20 | 1.95906 | 17.5 |
| 11 | −10.850 | 0.40 | 2.00100 | 29.1 |
| 12 | 31.307 | 0.10 | | |
| 13 | 15.574 | 2.42 | 1.95906 | 17.5 |
| 14 | −17.018 | 0.40 | 2.00100 | 29.1 |
| 15 | 303.514 | (Variable) | | |
| 16 | ∞ | 0.80 | | |
| 17 (Stop) | ∞ | 1.50 | | |
| 18* | 19.521 | 2.62 | 1.76802 | 49.2 |
| 19* | −262.374 | 0.10 | | |
| 20 | 31.981 | 2.09 | 1.43875 | 94.9 |
| 21 | −125.498 | 0.10 | | |
| 22 | 62.338 | 0.60 | 2.00085 | 27.0 |
| 23 | 28.231 | (Variable) | | |
| 24* | 27.479 | 2.00 | 1.55332 | 71.7 |
| 25 | −36.135 | 0.10 | | |
| 26 | 19.362 | 0.50 | 1.95906 | 17.5 |
| 27 | 13.275 | 3.31 | 1.43875 | 94.9 |
| 28 | −20.685 | (Variable) | | |
| 29 | −19.242 | 0.50 | 1.99470 | 29.8 |
| 30 | 9.713 | 2.73 | | |
| 31 | 63.453 | 1.54 | 1.79967 | 23.4 |
| 32 | −10.703 | 0.50 | | |
| 33 | ∞ | 2.20 | 1.51600 | 64.2 |
| 34 | ∞ | 3.89 | | |
| Image plane | ∞ | | | |

| Unit mm |
| --- |
| Aspherical surface data |
| Eighteenth surface |

K = 0.00000e+000 A4 = −5.03953e−005 A6 = −4.92406e−008
A8 = −1.05869e−009 A10 = 5.12446e−012
Nineteenth surface K = 0.00000e+000 A4 = −1.73548e−005 A6 = 2.77479e−008
Twenty-fourth surface K = 0.00000e+000 A4 = −1.17013e−004 A6 = −2.47915e−007
A8 = 2.15325e−008 A10 = −2.20682e−010

| Various data Zoom ratio 45.10 | | | |
| --- | --- | --- | --- |
| Focal length | 4.24 | 66.70 | 191.14 |
| F number | 1.65 | 5.49 | 6.00 |
| Half field angle (degree) | 35.29 | 2.58 | 0.90 |
| Image height | 3.00 | 3.00 | 3.00 |
| Total lens length | 89.38 | 89.38 | 89.38 |
| BF | 5.84 | 5.84 | 5.84 |
| d 7 | 0.64 | 27.37 | 31.01 |
| d15 | 30.77 | 4.04 | 0.40 |
| d23 | 7.36 | 2.38 | 10.82 |
| d28 | 4.01 | 8.99 | 0.55 |

| Zoom lens unit data | | |
| --- | --- | --- |
| Unit | First surface | Focal length |
| 1 | 1 | 42.76 |
| 2 | 8 | −5.26 |
| 3 | 16 | 23.70 |
| 4 | 24 | 15.67 |
| 5 | 29 | −47.21 |
| 6 | 33 | ∞ |

Numerical Example 5

| Unit mm | | | |
| --- | --- | --- | --- |
| Surface data | | | |
| Surface number | r | d | nd | vd |
| 1 | 48.337 | 1.30 | 2.00069 | 25.5 |
| 2 | 35.864 | 7.13 | 1.43875 | 94.9 |
| 3 | −2962.152 | 0.10 | | |
| 4 | 38.914 | 3.00 | 1.49700 | 81.5 |
| 5 | 81.708 | 0.10 | | |
| 6 | 31.764 | 3.49 | 1.49741 | 81.5 |
| 7 | 82.659 | (Variable) | | |
| 8 | 74.736 | 0.45 | 2.00100 | 29.1 |
| 9 | 6.188 | 3.00 | | |
| 10 | −26.341 | 1.52 | 1.95906 | 17.5 |
| 11 | −10.361 | 0.40 | 2.00100 | 29.1 |
| 12 | 27.305 | 0.10 | | |
| 13 | 15.129 | 2.29 | 1.95906 | 17.5 |
| 14 | −23.933 | 0.40 | 2.00100 | 29.1 |
| 15 | 99.734 | (Variable) | | |
| 16 | ∞ | 0.80 | | |
| 17 (Stop) | ∞ | 1.50 | | |
| 18* | 28.642 | 2.05 | 1.76802 | 49.2 |
| 19* | −146.610 | 0.10 | | |
| 20 | 35.035 | 3.18 | 1.43875 | 94.9 |
| 21 | −32.705 | 0.10 | | |
| 22 | 83.358 | 0.60 | 2.00100 | 28.5 |
| 23 | 34.579 | (Variable) | | |
| 24* | 27.633 | 2.31 | 1.55332 | 71.7 |
| 25 | −35.860 | 0.10 | | |
| 26 | 19.785 | 0.50 | 1.95906 | 17.5 |
| 27 | 13.686 | 2.87 | 1.43875 | 94.9 |
| 28 | −35.518 | (Variable) | | |

-continued

Unit mm

| | | | | |
|---|---|---|---|---|
| 29 | −28.785 | 0.50 | 1.97454 | 31.7 |
| 30 | 8.686 | 3.03 | | |
| 31 | 37.804 | 1.50 | 1.77271 | 25.4 |
| 32 | −12.366 | 0.50 | | |
| 33 | ∞ | 2.20 | 1.51600 | 64.2 |
| 34 | ∞ | 3.89 | | |
| Image plane | ∞ | | | |

Aspherical surface data

Eighteenth surface

K = 0.00000e+000 A4 = −3.07742e−005 A6 = 3.73797e−008
A8 = −9.05237e−010 A10 = 3.99687e−012
Nineteenth surface K = 0.00000e+000 A4 = 1.08386e−005 A6 = 2.62614e−008
Twenty-fourth surface K = 0.00000e+000 A4 = −4.39913e−005 A6 = −2.61254e−007
A8 = 1.43198e−008 A10 = −1.35657e−010

Various data
Zoom ratio 50.09

| | | | |
|---|---|---|---|
| Focal length | 4.25 | 71.59 | 213.01 |
| F number | 1.65 | 5.95 | 6.50 |
| Half field angle (degree) | 35.20 | 2.40 | 0.81 |
| Image height | 3.00 | 3.00 | 3.00 |
| Total lens length | 94.99 | 94.99 | 94.99 |
| BF | 5.84 | 5.84 | 5.84 |
| d 7 | 0.55 | 30.02 | 34.04 |
| d15 | 34.29 | 4.82 | 0.80 |
| d23 | 7.59 | 1.81 | 11.31 |
| d28 | 4.32 | 10.10 | 0.60 |

Zoom lens unit data

| Unit | First surface | Focal length |
|---|---|---|
| 1 | 1 | 46.95 |
| 2 | 8 | −5.45 |
| 3 | 16 | 24.04 |
| 4 | 24 | 17.71 |
| 5 | 29 | −49.37 |
| 6 | 33 | ∞ |

(Numerical Example 6)

Unit mm
Surface data

| Surface number | r | d | nd | vd |
|---|---|---|---|---|
| 1 | 52.530 | 1.30 | 2.00069 | 25.5 |
| 2 | 33.828 | 5.14 | 1.43975 | 94.9 |
| 3 | 508.759 | 0.10 | | |
| 4 | 39.119 | 2.88 | 1.49700 | 81.5 |
| 5 | 115.074 | 0.10 | | |
| 6 | 29.746 | 3.15 | 1.67776 | 57.9 |
| 7 | 87.210 | (Variable) | | |
| 8 | 96.118 | 0.45 | 2.00100 | 29.1 |
| 9 | 6.362 | 2.92 | | |
| 10 | −22.400 | 1.20 | 1.95906 | 17.5 |
| 11 | −11.647 | 0.40 | 2.00100 | 29.1 |
| 12 | 29.403 | 0.10 | | |
| 13 | 15.877 | 2.30 | 1.95906 | 17.5 |
| 14 | −21.598 | 0.40 | 2.00100 | 29.1 |
| 15 | −11361.397 | (Variable) | | |
| 16 | ∞ | 0.80 | | |
| 17 (Stop) | ∞ | 1.50 | | |
| 18* | 17.560 | 2.22 | 1.76802 | 49.2 |
| 19* | 324.482 | 0.10 | | |
| 20 | 27.159 | 1.92 | 1.43875 | 94.9 |

-continued

Unit mm

| | | | | |
|---|---|---|---|---|
| 21 | −190.306 | 0.10 | | |
| 22 | 72.053 | 0.60 | 1.94436 | 23.6 |
| 23 | 31.983 | (Variable) | | |
| 24* | 30.396 | 1.71 | 1.55332 | 71.7 |
| 25 | −36.711 | 0.10 | | |
| 26 | 19.678 | 0.50 | 1.95906 | 17.5 |
| 27 | 13.484 | 2.92 | 1.43875 | 94.9 |
| 28 | −21.276 | (Variable) | | |
| 29 | −21.221 | 0.50 | 1.99960 | 29.3 |
| 30 | 9.841 | 1.37 | | |
| 31 | 45.847 | 1.33 | 1.80816 | 22.8 |
| 32 | −12.172 | 0.50 | | |
| 33 | ∞ | 2.20 | 1.51600 | 64.2 |
| 34 | ∞ | 3.89 | | |
| Image plane | ∞ | | | |

Aspherical surface data

Eighteenth surface

K = 0.00000e+000   A4 = −3.39995e−005   A6 = 6.36518e−008
A8 = 9.11597e−010  A10 = −6.90885e−012
Nineteenth surface K = 0.00000e+000   A4 = 8.91588e−006   A6 = 2.52342e−007
Twenty-fourth surface K = 0.00000e+000   A4 = −1.25889e−004   A6 = 7.07707e−007
A8 = −1.12887e−008  A10 = 1.35577e−010

Various data
Zoom ratio 34.09

| | | | |
|---|---|---|---|
| Focal length | 4.29 | 59.58 | 146.39 |
| F number | 1.65 | 4.58 | 5.00 |
| Half field angle (degree) | 34.94 | 2.88 | 1.17 |
| Image height | 3.00 | 3.00 | 3.00 |
| Total lens length | 81.53 | 81.53 | 81.53 |
| BF | 5.84 | 5.84 | 5.84 |
| d 7 | 0.60 | 25.78 | 29.21 |
| d15 | 28.80 | 3.62 | 0.19 |
| d23 | 5.88 | 2.01 | 9.67 |
| d28 | 4.29 | 8.16 | 0.49 |

Zoom lens unit data

| Unit | First surface | Focal length |
|---|---|---|
| 1 | 1 | 40.26 |
| 2 | 8 | −5.78 |
| 3 | 16 | 22.11 |
| 4 | 24 | 16.24 |
| 5 | 29 | −24.22 |
| 6 | 33 | ∞ |

A relationship between the conditional expressions described above and the numerical values in Numerical Examples is shown in Table 1.

TABLE 1

| Conditional Expression | Numerical Example | | | | | |
|---|---|---|---|---|---|---|
| | 1 | 2 | 3 | 4 | 5 | 6 |
| (1) | 1.97 | 1.97 | 2.00 | 2.14 | 2.24 | 1.80 |
| (2) | 31.51 | 32.03 | 31.37 | 36.34 | 39.08 | 25.31 |
| (3) | 1.91 | 2.50 | 2.00 | 2.44 | 2.60 | 2.43 |
| (4) | 4.83 | 4.85 | 5.27 | 5.77 | 6.14 | 4.35 |
| (5) | 0.56 | 0.50 | 0.42 | 0.57 | 0.60 | 0.43 |
| (6) | 2.06 | 1.64 | 1.60 | 1.80 | 1.80 | 1.80 |
| (7) | 28.51 | 28.60 | 28.44 | 29.79 | 31.66 | 27.18 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207104, filed Oct. 2, 2013, which is hereby incorporated by reference herein in its entirety.

What is claimed is:

1. A zoom lens, comprising, in order from an object side to an image side:
  a first lens unit having a positive refractive power;
  a second lens unit having a negative refractive power;
  a third lens unit having a positive refractive power;
  a fourth lens unit having a positive refractive power; and
  a fifth lens unit having a negative refractive power,
  during zooming, the first lens unit, the third lens unit, and the fifth lens unit being immovable, and the second lens unit and the fourth lens unit being moved,
  wherein the fifth lens unit comprises a partial unit having a negative refractive power and a partial unit having a positive refractive power in order from the object side to the image side with a widest air gap in the fifth lens unit as a boundary, and the following conditional expressions are satisfied:

$1.70 < ft/TL < 2.50;$ $23 < ft/|f2| < 100;$ and $1.0 < f4/|f5n| < 5.0$ where TL represents an entire lens length, ft represents a focal length of an entire system at a telephoto end, f2 represents a focal length of the second lens unit, f4 represents a focal length of the fourth lens unit, and f5n represents a focal length of the partial unit having the negative refractive power.

2. A zoom lens according to claim 1, wherein the following conditional expression is satisfied:

$4.0 < BL2str/|f2| < 10.0$ where BL2str represents a movement amount of the second lens unit during the zooming from a wide angle end to the telephoto end.

3. A zoom lens according to claim 1, wherein the following conditional expression is satisfied:

$0.3 < L5d/D5 < 0.9$ where L5d represents an interval on an optical axis between the partial unit having the negative refractive power and the partial unit having the positive refractive power, and D5 represents an interval on the optical axis from a lens surface of the fifth lens unit closest to the object side to a lens surface of the fifth lens unit closest to the image side.

4. A zoom lens according to claim 1, wherein the following conditional expression is satisfied:

$1.0 < f5p/|f5n| < 3.0$ where f5p represents a focal length of the partial unit having the positive refractive power.

5. A zoom lens according to claim 1, wherein the partial unit having the negative refractive power consists of a single negative lens, and the partial unit having the positive refractive power consists of a single positive lens.

6. An image pickup apparatus, comprising:
  a zoom lens; and
  an image pickup element configured to receive an image formed by the zoom lens,
  wherein the zoom lens comprises, in order from an object side to an image side:
    a first lens unit having a positive refractive power;
    a second lens unit having a negative refractive power;
    a third lens unit having a positive refractive power;
    a fourth lens unit having a positive refractive power; and
    a fifth lens unit having a negative refractive power,
  wherein during zooming, the first lens unit, the third lens unit, and the fifth lens unit are immovable, and the second lens unit and the fourth lens unit are moved, and
  wherein the fifth lens unit comprises a partial unit having a negative refractive power, and a partial unit having a positive refractive power in order from the object side to the image side with a widest air gap in the fifth lens unit as a boundary, and the following conditional expressions are satisfied:

$1.70 < ft/TL < 2.50;$ $23 < ft/|f2| < 100;$ and $1.0 < f4/|f5n| < 5.0$ where TL represents an entire lens length, ft represents a focal length of an entire system at a telephoto end, f2 represents a focal length of the second lens unit, f4 represents a focal length of the fourth lens unit, and f5n represents a focal length of the partial unit having the negative refractive power.

7. An image pickup apparatus according to claim 6, wherein the following conditional expression is satisfied:

$27 < TL/hmax < 32$ where hmax represents a half of a length of a diagonal line of an effective imaging area of the image pickup element.

* * * * *